(12) United States Patent
Miki

(10) Patent No.: US 11,287,293 B2
(45) Date of Patent: Mar. 29, 2022

(54) SENSOR APPARATUS

(71) Applicant: DENSO CORPORATION, Kariya (JP)

(72) Inventor: Takuya Miki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/202,523

(22) Filed: Mar. 16, 2021

(65) Prior Publication Data

US 2021/0293587 A1 Sep. 23, 2021

(30) Foreign Application Priority Data

Mar. 18, 2020 (JP) .............................. JP2020-047726

(51) Int. Cl.
*G01D 11/30* (2006.01)
*F16B 21/02* (2006.01)

(52) U.S. Cl.
CPC .............. *G01D 11/30* (2013.01); *F16B 21/02* (2013.01)

(58) Field of Classification Search
CPC ................................ G01D 11/30; F16B 21/02
See application file for complete search history.

(56) References Cited

U.S. PATENT DOCUMENTS

2012/0000291 A1* 1/2012 Christoph ............... F16B 21/02
73/700

* cited by examiner

*Primary Examiner* — Jamel E Williams
(74) *Attorney, Agent, or Firm* — Maschoff Brennan

(57) ABSTRACT

A sensor apparatus has a sensor protruding portion and a sensor support which are formed integrally with each other. The sensor apparatus also includes a retainer, an inner seal, an outer seal, a fastener, and a friction reducer. The retainer is rotatable relative to the sensor protruding portion and the sensor support. The inner seal is disposed between the sensor support and the retainer. The outer seal is disposed between a wall and the retainer. The fastener includes a fitting groove formed in one of the sensor support and the retainer and a protrusion formed on the other of the sensor support and the retainer. The protrusion is engaged in the fitting groove to achieve installation of the sensor apparatus in the wall. The friction reducer works to increase an interval between the sensor support and the retainer to reduce a degree of friction produced by the inner seal when the sensor support is turned relative to the retainer to install the sensor apparatus in the wall. This permits a sensor installing operator to easily confirm completion of his or her work to install the sensor apparatus in the wall.

7 Claims, 19 Drawing Sheets

SENSOR APPARATUS

CROSS REFERENCE TO RELATED DOCUMENT

The present application claims the benefit of priority of Japanese Patent Application No. 2020-047726 filed on Mar. 18, 2020, the disclosure of which is incorporated herein by reference.

BACKGROUND

1 Technical Field

This disclosure relates generally to a sensor apparatus.

2 Background Art

A sensor apparatus is known which is attached to a wall of an inner door panel of a vehicle in use.

Japanese patent No. 5579184 discloses a sensor designed to be secured to a wall by inserting a retaining wing into an opening formed in the wall and then turning the retaining wing and a support element relative to each other. The sensor is equipped with an end stopper which controls an amount by which the retaining wing is turned when the sensor is installed in the wall.

The retaining wing corresponds to a sensor protruding portion in a sensor apparatus discussed in the following embodiments. The support element also corresponds to a retainer of the sensor apparatus in the following embodiments.

The sensor taught in the above publication is, however, designed not to have a mechanism which generates a low degree of mechanical vibration transmitted to fingers of an operator or sound, such as clicking, (which will also be referred to as a sense of complete installation or a gentle completion feedback) upon completion of work to install the sensor in the wall. When a degree of torque required to turn the retaining wing and the support element relative to each other is high, it is also difficult for the operator to clearly perceive whether the installation work is completed even though the retaining wing contacts the end stopper. This may result in insufficient turn of the retaining wing when the sensor is installed in the wall, thus leading to a failure in installation of the sensor.

SUMMARY

It is, thus, an object of this disclosure to provide a sensor apparatus designed to allow an operator to easily confirm or detect completion of installation of the sensor apparatus in or on a wall.

According to one aspect of this disclosure, there is provided a sensor apparatus which is configured to be installable to a wall in use. The sensor apparatus comprises: (a) a sensor protruding portion which is configured to be inserted into an opening formed in the wall; (b) a sensor support which is formed integrally with the sensor protruding portion and larger in size than the opening; (b) a retainer which has formed therein a through-hole through which the sensor protruding portion passes, the retainer being configured to be arranged between the sensor support and the wall and rotatable relative to the sensor protruding portion and the sensor support; (c) an inner seal which is disposed between the sensor support and the retainer; (d) an outer seal which is configured to be disposed between the wall and the retainer; (e) a fastener which includes a fitting groove and a protrusion, the fitting groove being formed in one of the sensor support and the retainer, the protrusion being formed on the other of the sensor support and the retainer, the fitting groove and the protrusion being configured to achieve engagement with each other when the sensor support has been brought from an initial state where the sensor protrusion is inserted into the opening of the wall into an installed state where the sensor support has been turned by a given angle from the initial state; and (f) a friction reducer (70) which works to increase an interval between the sensor support and the retainer to reduce a degree of friction created by the inner seal before the sensor support is placed in the installed state after turned relative to the retainer from the initial state.

When the sensor support is turned from the initial state to install the sensor apparatus to the wall, the friction reducer works to reduce the degree of friction produced by the inner seal, thereby resulting in a decreased degree of torque required to turn the sensor support and the retainer relative to each other. This makes a sensor installing operator clearly perceive the sense of complete installation upon engagement of the protrusion in the fitting groove. This avoids a lack in turn of the sensor support relative to the retainer to ensure the stability in installing the sensor apparatus to the wall.

In this disclosure, the sense of complete installation is created by a low degree of mechanical vibration or sound, such as clicking, transmitted to, for example, fingers of an operator.

Symbols in brackets attached to component parts, as discussed below, are used only to indicate exemplified correspondences between the symbols and the component parts.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5 is an exploded perspective view of the sensor apparatus in

FIG. 4;

DESCRIPTION OF THE PREFERRED EMBODIMENTS

Embodiments will be described below with reference to the drawings. The same reference numbers used throughout the embodiments will refer to the same or equivalent parts, and explanation thereof in detail will be omitted once referred to.

First Embodiment

Figure 1:
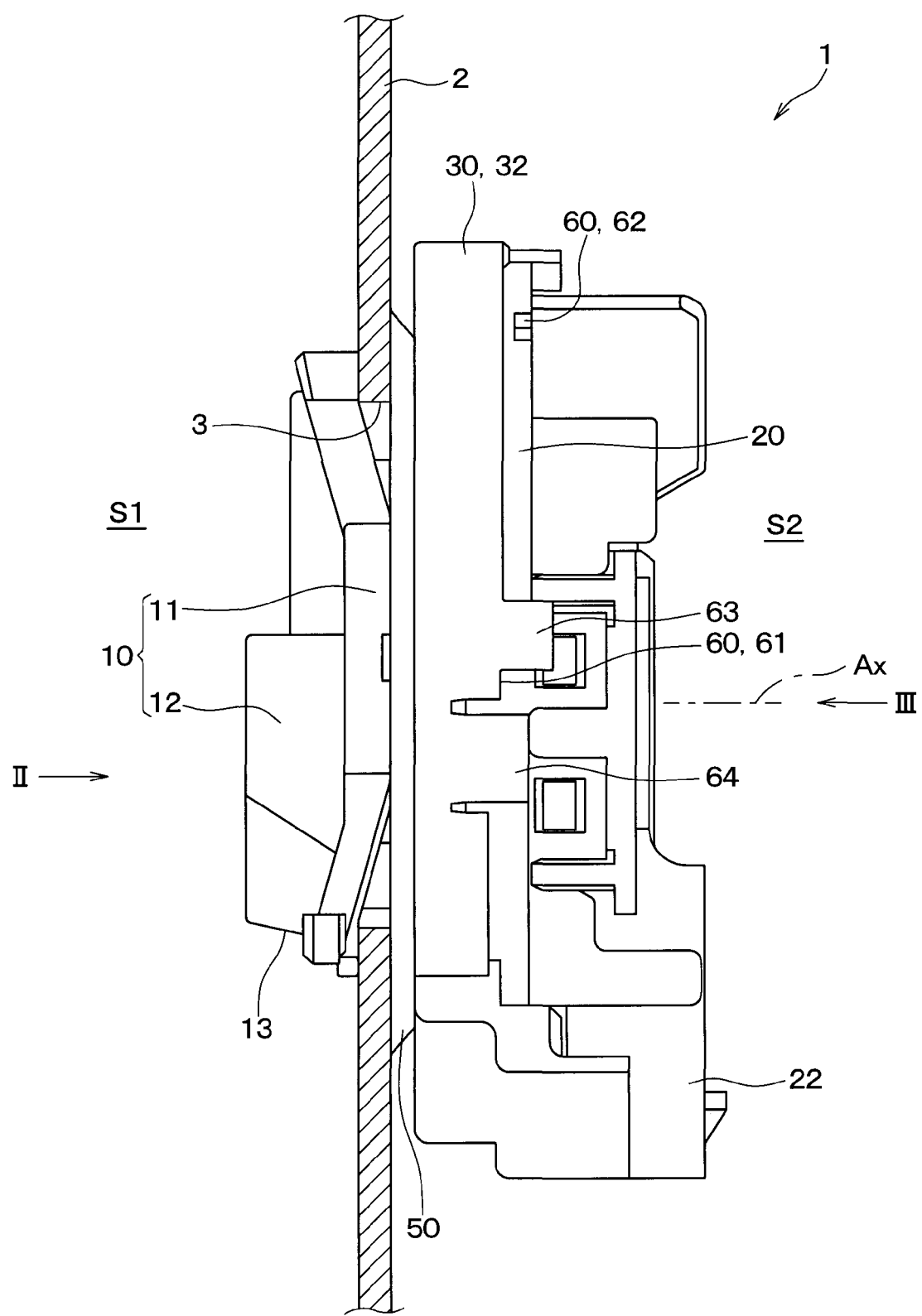
FIG. 1 is a side view which illustrate a sensor apparatus installed in a wall according to the first embodiment.

The sensor apparatus 1 in this embodiment is, as illustrated in FIG. 1, attached to a wall (which will be referred to below as a panel 2) of, for example, an inner door panel of a vehicle in use.

The sensor apparatus 1, as illustrated in FIGS. 2 to 8, includes the sensor protruding portion 10, the sensor support 20, the retainer 30, the inner seal 40, the outer seal 50, the fasteners 60, the friction reducers 70, and the turn starters 80.

Figure 5:
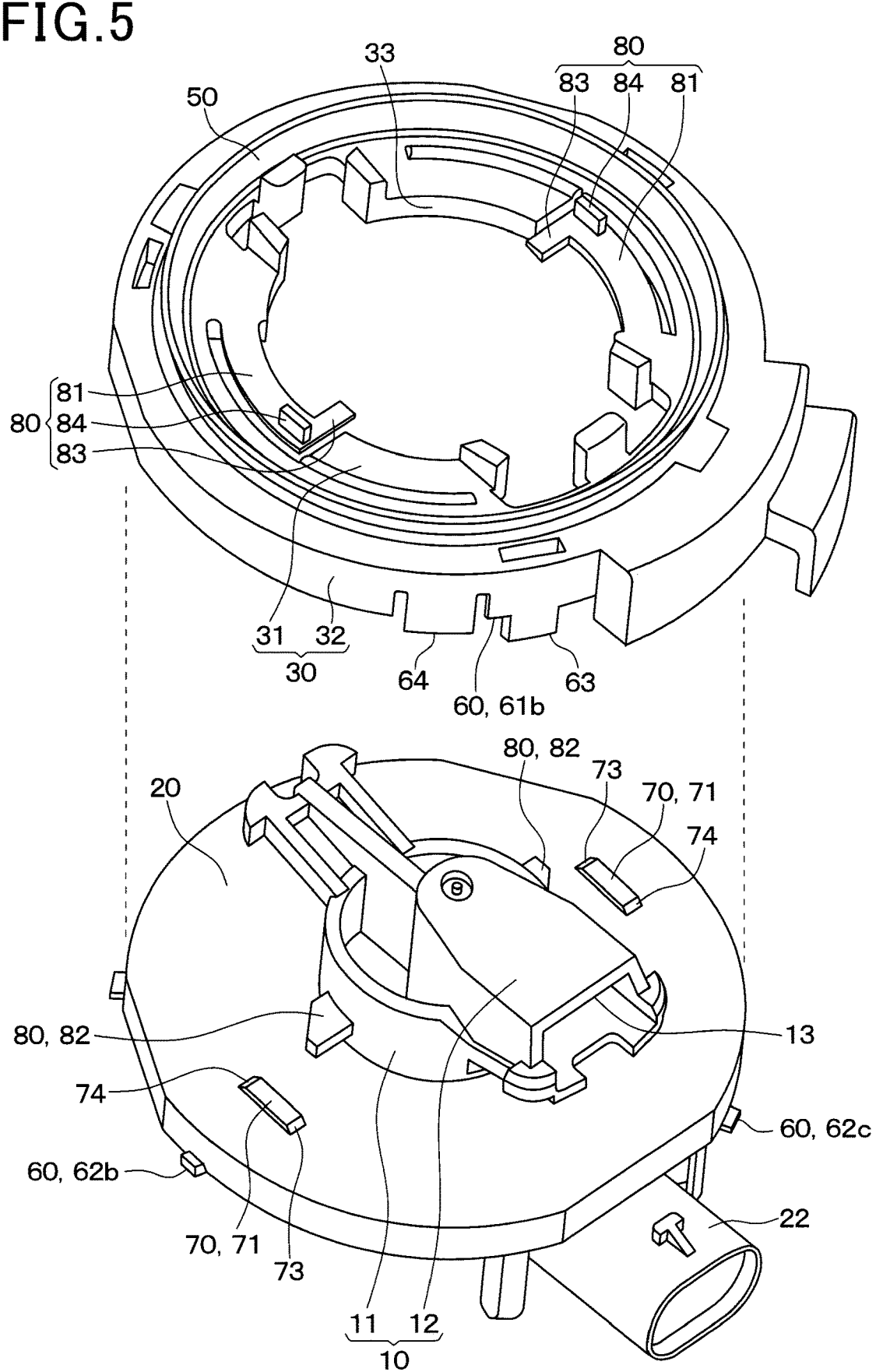
Figure 6:
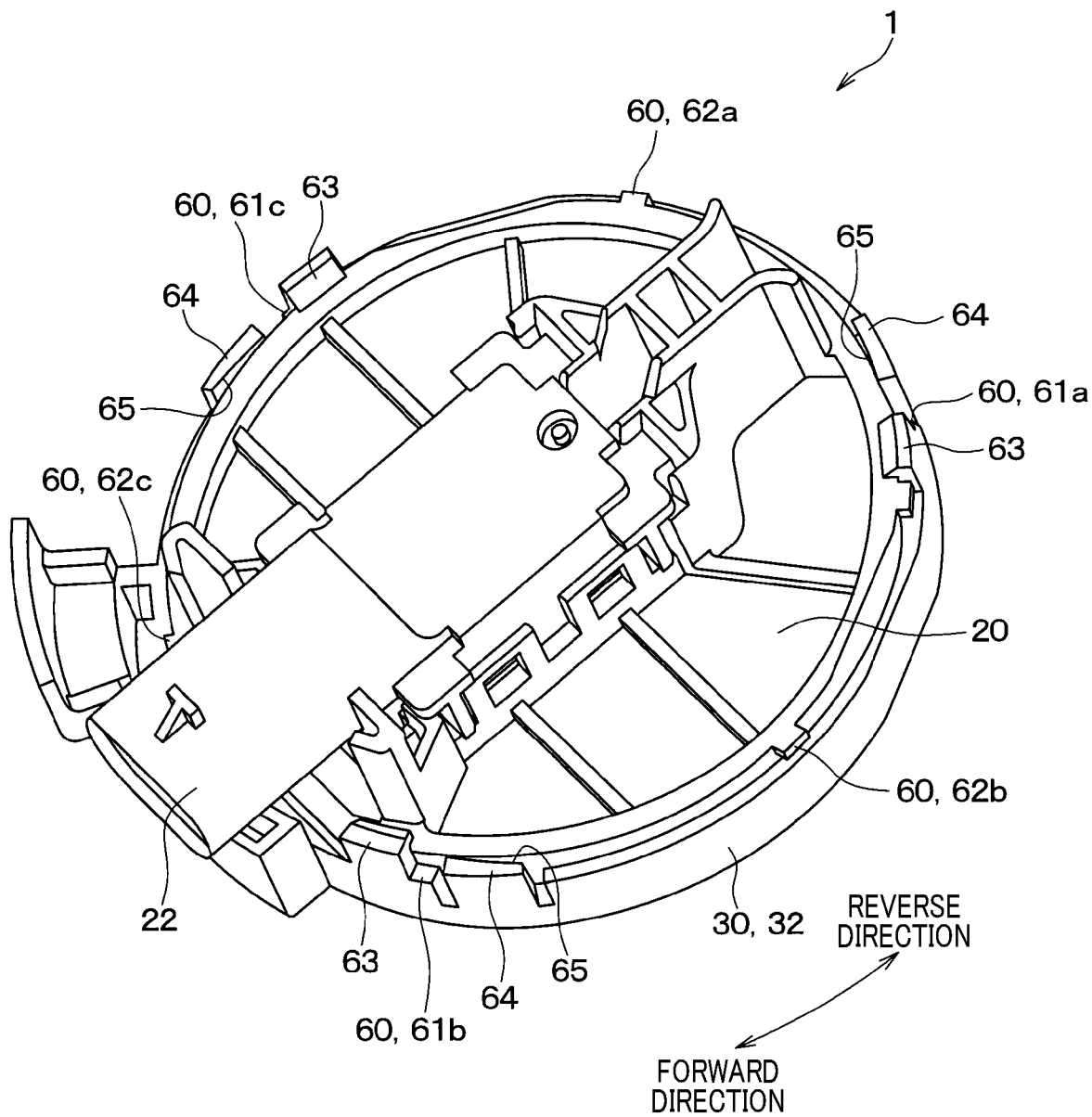
FIG. 6 is a perspective view which illustrates a sensor apparatus, as viewed facing a connector.
Figure 8:
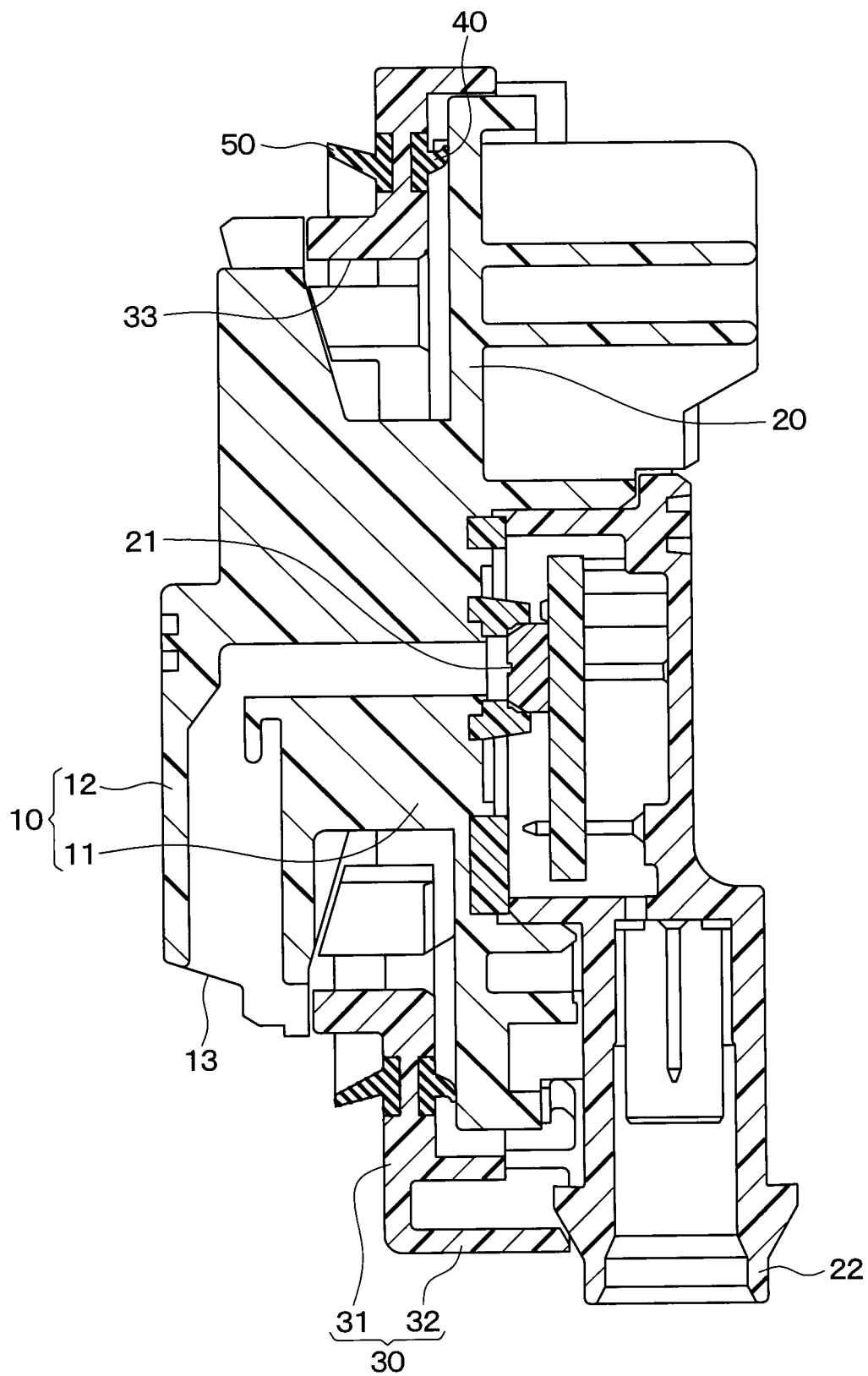
FIG. 8 is a sectional view taken along the line VIII-VIII in FIGS. 2 and 3.

The sensor protruding portion 10 and the sensor support 20 are, as can be seen in FIGS. 5 and 8, formed integrally with each other in the shape of a one-piece member. The sensor protruding portion 10 includes the cylinder 11 and the extension 12. The cylinder 11 protrudes from the sensor support 20 in a hollow cylindrical shape. The extension 12 extends in a direction traversing an axial center line of the cylinder 11. The extension 12 has the air inlet opening 13 formed in an end thereof.

The sensor support 20 is formed in a substantially disc shape. The sensor support 20 has disposed therein the sensor device 21 which works to output a voltage signal as a function of a physical property (i.e., pressure) of air inputted through the air inlet opening 13 of the sensor protruding portion 10. The sensor support 20 has attached thereto the connector 22 which outputs the voltage signal to an external device.

The retainer 30 includes the ring-shaped annular portion 31 and the outer edge portion 32 which is formed on an outer edge of the annular portion 31 in a cylindrical shape. The annular portion 31 has formed therein the through-hole 33 through which the sensor protruding portion 10 passes. The annular portion 31 is disposed on the sensor support 20 on the same side as the sensor protruding portion 10. In other words, when the sensor apparatus 1 is attached to the panel 2, the annular portion 31 is located between the sensor support 20 and the panel 2. The outer edge portion 32 is located radially outside the sensor support 20 and surrounds an outer periphery of the sensor support 20.

The sensor protruding portion 10 and the sensor support 20 are configured to be rotatable relative to the retainer 30. In the following discussion, a direction extending parallel to an axis Ax of relative rotation of an assembly of the sensor protruding portion 10 and the sensor support 20 and the retainer 30 will also be referred to as a rotation axial direction.

The panel 2 to which the sensor apparatus 1 is secured, as clearly illustrated in FIG. 1, has the opening 3 in which the sensor protruding portion 10 is fitted. The opening 3 has the substantially the same shape as that of the sensor protruding portion 10, as viewed in the rotation axial direction. Specifically, the opening 3 is formed to be slightly larger in size than the sensor protruding portion 10. In other words, the sensor protruding portion 10 has a diameter slightly smaller than that of the opening 2. This enables the sensor protruding portion 10 and the sensor support 20 to be turned relative to the retainer 30 after the sensor protruding portion 10 is inserted into the opening 3 of the panel 2 to achieve firm attachment of the sensor apparatus 1 to the panel 2. The sensor support 20 is larger in diameter or size than the opening 30.

In this embodiment, the space S1 into which the sensor protruding portion 10 passes through the panel 2. The space S1 is defined by, for example, a chamber in which a door window glass of the vehicle is disposed and will also be referred to below as a glass storage space S1. The glass storage space S1 may be subjected to entry of rain thereinto. The space S2 in which the sensor support 20 and the retainer 30 are arranged on the panel 2 is defined by, for example, a space which is located inside a passenger compartment of the vehicle and in which interior parts of the door of the vehicle are disposed. The sensor apparatus 1 is, therefore, equipped with the inner seal 40 and the outer seal 50 to stop entry of, for example, rain into the space S2 within the passenger compartment of the vehicle from the glass storage space S1 through the opening 3 of the panel 2.

Figure 7:
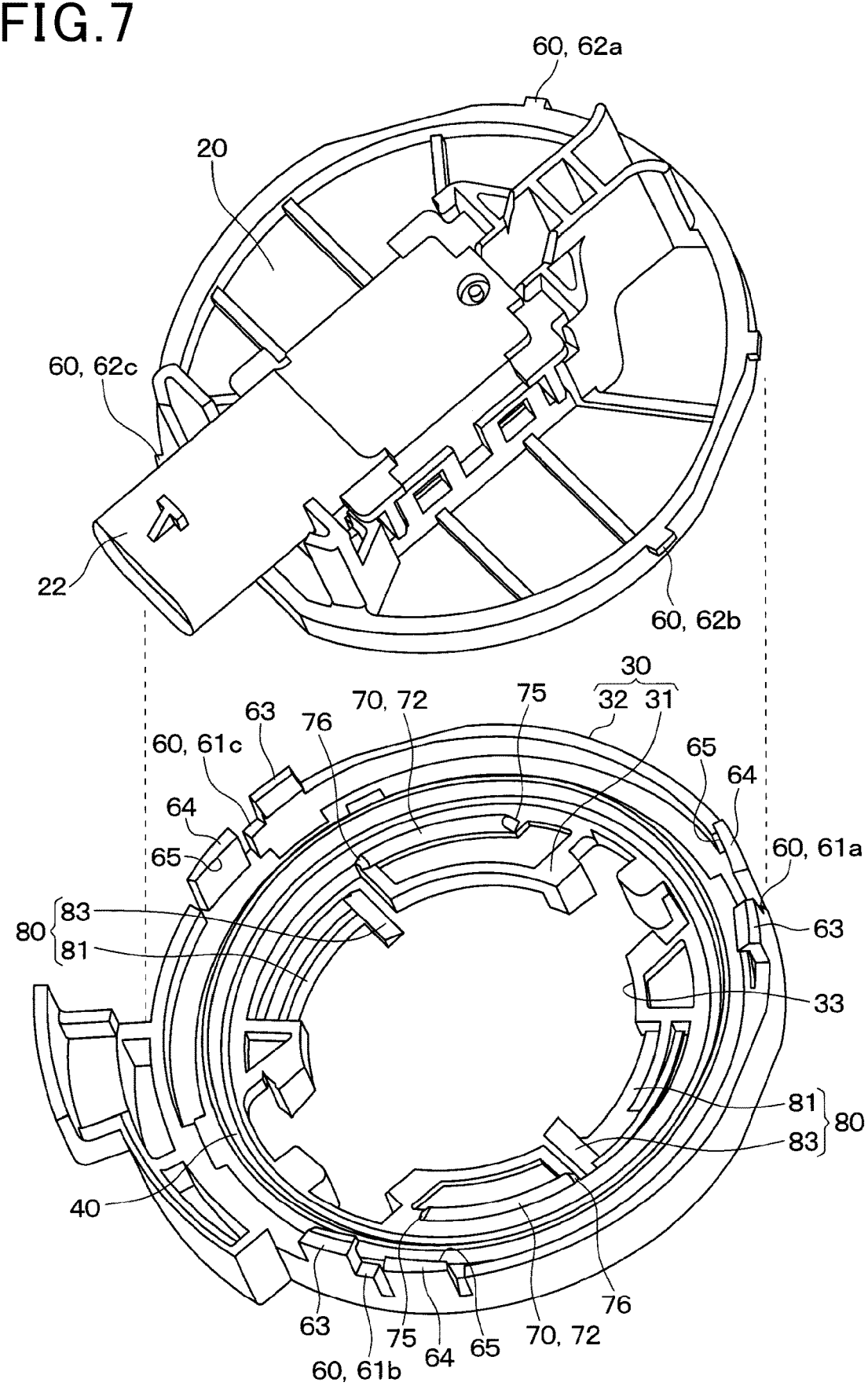
FIG. 7 is an exploded view which illustrates the sensor apparatus in FIG. 6.

The inner seal 40 is, as clearly illustrated in FIGS. 7 and 8, arranged between the sensor support 20 and the retainer 30. The inner seal 40 is made from, for example, rubber or elastomer and located outside the through-hole 33 on the annular portion 31 of the retainer 30. The inner seal 40 is arranged between the sensor support 20 and the retainer 30 with being compressed or elastically deformed. Specifically, the inner seal 40 is of an annular shape and arranged radially outside the friction reducers 70, thereby stopping water from flowing into a region radially inside the inner seal 40 or a region radially outside the inner seal 40 within a clearance between the sensor support 20 and the retainer 30. This prevents, for example, rain water, as having entered the clearance between the sensor support 20 and the retainer 30 from the glass storage space S1 through the opening 3 of the panel 2, from flowing into the space S2 within the passenger compartment of the vehicle. The compression or elastic deformation of the inner seal 40 between the sensor support 20 and the retainer 30 functions to minimize a risk that mechanical noise arising from play between the sensor support 20 and the retainer 30 may occur.

Figure 2:
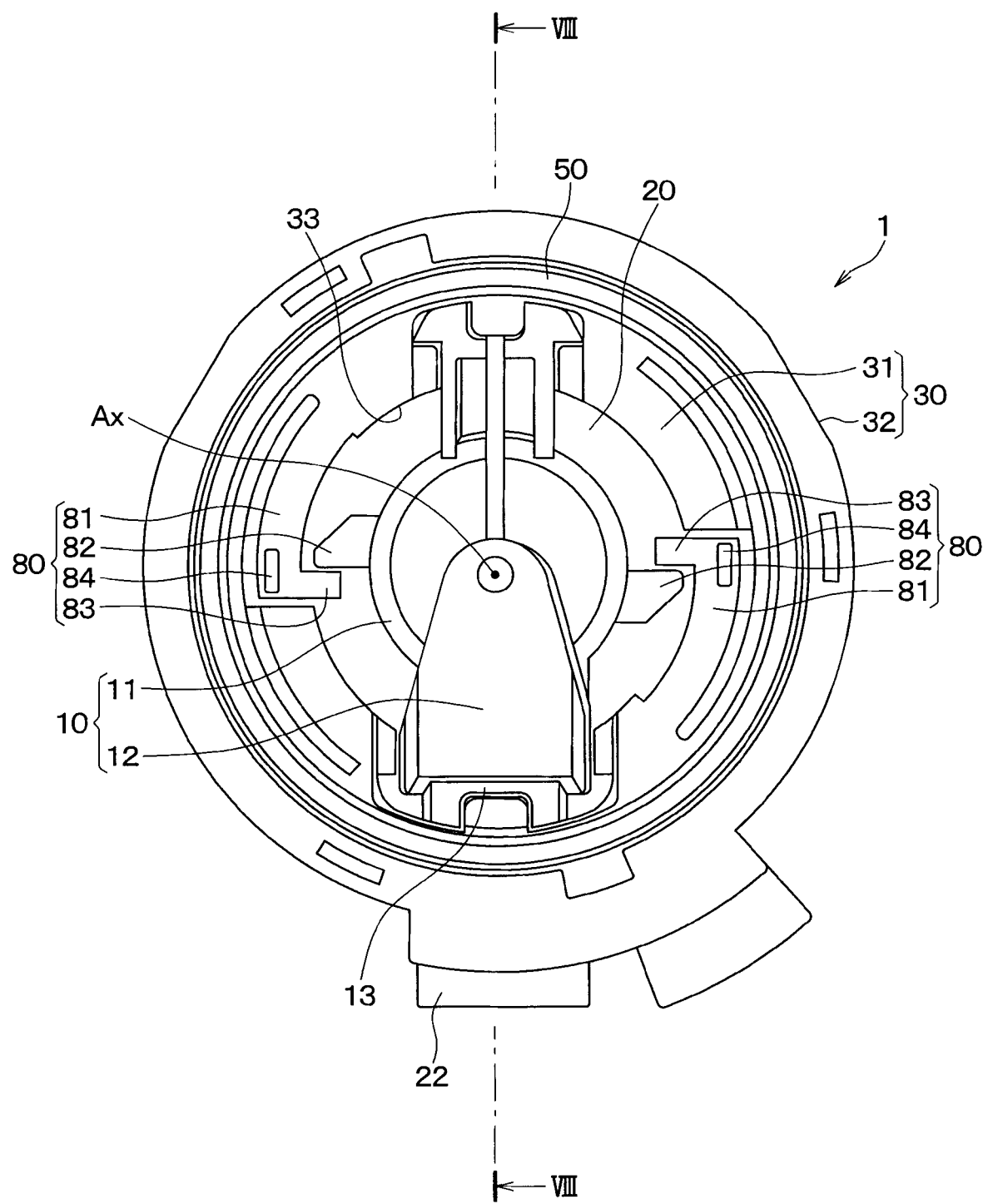
FIG. 2 is a plan view which illustrates the sensor apparatus, as viewed in a direction II in FIG. 1 and from which the wall illustrated in FIG. 1 is omitted.
Figure 3:
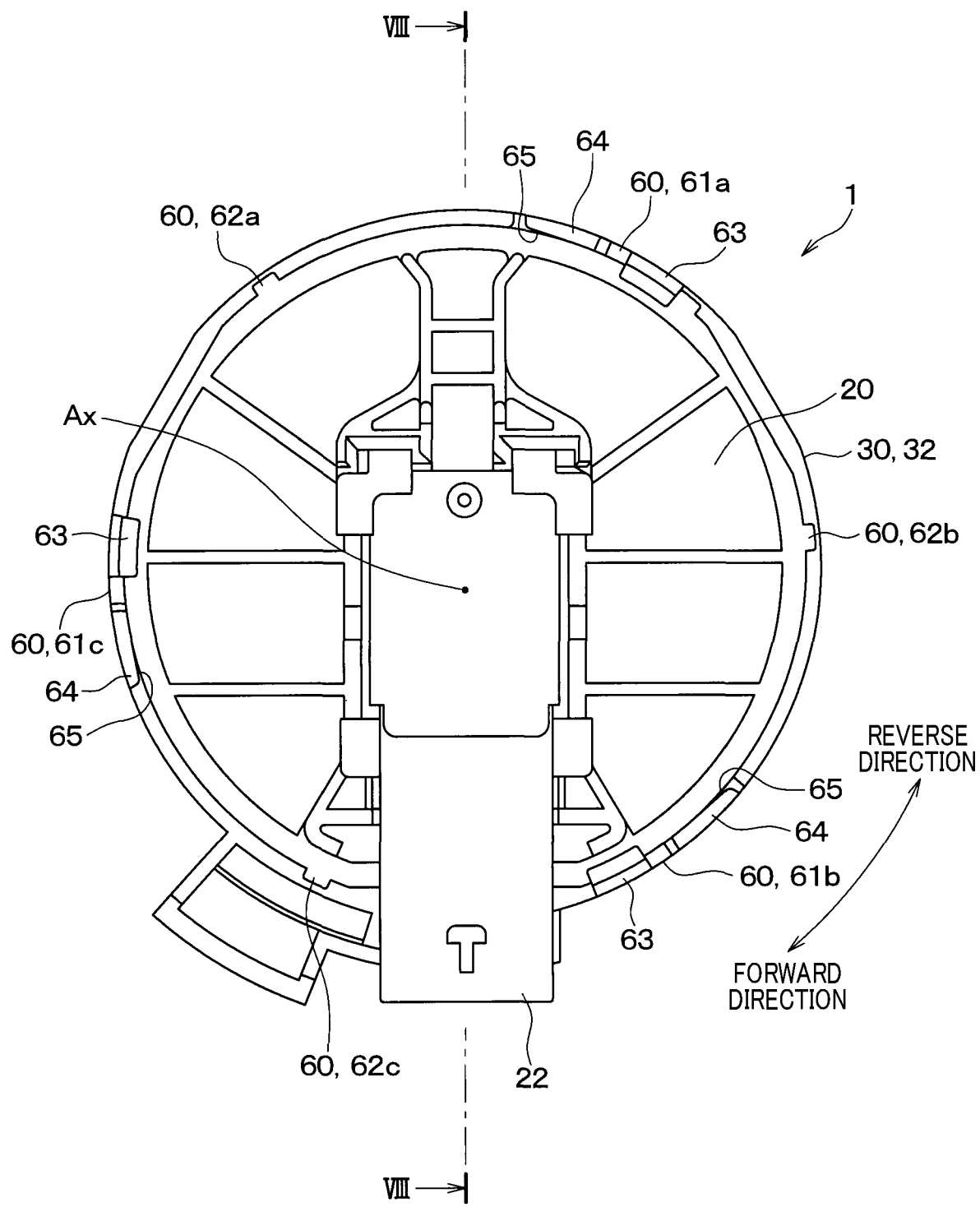
FIG. 3 is a plan view which illustrates the sensor apparatus, as viewed in a direction III in FIG. 1 and from which the wall illustrated in FIG. 1 is omitted.

The outer seal 50 is, as clearly illustrated in FIGS. 1, 2, and 5, arranged on a surface of the retainer 30 which is opposite a surface of the retainer 30 on which the inner seal 40 is disposed. The outer seal 50 is made from, for example, rubber or elastomer and located outside the through-hole 33 on the annular portion 31 of the retainer 30. The outer seal 50 is arranged between the panel 2 and the retainer 30 with being compressed or elastically deformed. This stops water from flowing into a region radially inside the outer seal 50 or a region radially outside the outer seal 50 within a clearance between the panel 2 and the retainer 30 in a condition where the sensor apparatus 1 is secured to the panel 2. This prevents, for example, rain water, as having entered the clearance between the panel 2 and the retainer 30 from the glass storage space S1 through the opening 3 of the panel 2, from flowing into the space S2 within the passenger compartment of the vehicle.

The compression or elastic deformation of the outer seal 50 between the panel 2 and the retainer 30 functions to minimize a risk that mechanical noise arising from play between the panel 2 and the retainer 30 may occur and also to hold the panel 2 and the retainer 30 from rotating relative to each other.

The fasteners 60, as illustrated in FIGS. 3 to 7, include the fitting grooves 61 and the protrusions 62. The fitting grooves 61 are formed in the outer edge portion 32 of the retainer 30. The protrusions 62 are formed on a radially outer portion or periphery of the sensor support 20. The firm attachment of the sensor apparatus 1 to the panel 2 is, as described above, achieved by inserting the sensor protruding portion 10 into the opening 3 of the panel 2 and then turning the sensor protruding portion 10 and the sensor support 20 relative to the retainer 30. Upon such attachment, the protrusions 62 are fit in the fitting grooves 61. In FIGS. 3 to 7, each of the protrusions 62 and a corresponding one of the fitting grooves 61 which are fit together are expressed using the same lower-case alphabetic affix of "a", "b", or "c". The fasteners 60 are configured to create the sense of complete installation upon fitting of the protrusions 62 in the fitting grooves 61. How to develop the sense of complete installation when the protrusions 62 are fitted in the fitting grooves 61 will be described later in detail.

In the following discussion, a state where the sensor protruding portion 10 is fit in the opening 3 of the panel 2 will be referred to as an initial state. A state where the sensor support 20 has been turned from the initial state by a given angle relative to the retainer 30 to achieve engagement of the protrusions 62 with the fitting grooves 61, in other words, where the sensor support 20 is located at a given angular interval away from the initial state will also be referred to as an installed state. A direction, as demonstrated in FIGS. 3 and 6, in which the sensor protruding portion 10 and the sensor support 20 are rotated relative to the retainer 30 in a transition state between the initial state and the installed state will also be referred to as a forward direction. An opposite direction to the forward direction will be referred to as a reverse direction. FIGS. 1 to 4, 6, and 8 each show the initial state.

The fitting claws 63 are arranged in front of the fitting grooves 61 in the forward direction. The fitting claws 63 serve as locks to hold the sensor support 20 from being moved away from the retainer 30. Each of the fitting claws 63 forms a wall located in front of a respective one of the fitting grooves 61 in the forward direction.

The retainer 30 has the sliding contact walls 64 formed on a radially outer portion or periphery thereof. The sliding contact walls 64 are arranged in front of the fitting grooves 61 in the reverse direction. The sliding contact walls 64 serve as walls with which the protrusions 62 are placed in sidling contact immediately before the stalled state is established following rotation of the sensor protruding portion 10 and the sensor support 20 from the initial state. Each of the sliding contact walls 64 has a radially inner surface which is defined as the slant sliding wall surface 65 which slopes so as to gradually approach the sensor support 20 in the forward direction. In other words, each of the slant sliding wall surface 65 is configured to have a gap between itself and the sensor support 20 which gradually increases in the forward direction. Before the installed state is entered from the initial state, each of the sliding contact walls 64 is shaped to generate friction between itself and a corresponding one of the protrusions 62 to increase a degree of torque required to achieve relative rotation of the sensor support 20 and the retainer 30, and release such friction upon engagement the protrusion 62 with the fitting groove 61. In other words, each of the sliding contact walls 64 functions to generate a spring pressure which creates the sense of complete installation upon fitting of the protrusion 62 in the fitting groove 61 and will also be referred to as a sense of complete installation creating spring. Each of the sliding contact walls 64 forms a wall located in front of one of the fitting grooves 61 in the reverse direction. Although not illustrated, at least one of the sliding contact walls 64 is preferably shaped to be taller than the protrusions 62 in the rotation axial direction.

Each of the friction reducers 70, as clearly illustrated in FIGS. 5 and 7, includes the support-side convex portion 71 and the retainer-side convex portion 72. The support-side convex portion 71 is formed on the sensor support 20. The retainer-side convex portion 72 is formed on the retainer 30. The support-side convex portion 71 is shaped to protrude from the sensor support 20 toward the retainer 30 in the rotation axial direction. The retainer-side convex portion 72 is shaped to protrude from the retainer 30 toward the sensor support 20 in the rotation axial direction.

Each of the support-side convex portion 71 and a corresponding one of the retainer-side convex portion 72 become overlapped with each other in the rotation axial direction during rotation of the sensor support 20 from the initial state. Upon overlap of the support-side convex portion 71 with the retainer-side convex portion 72 in the rotation axial direction, a total thickness thereof will result in an increase in gap between the sensor support 20 and the retainer 30. This results in a decrease in compression or deformation of the inner seal 40 attached to the retainer 30, thereby leading to a decrease in friction between the inner seal 40 and the sensor support 20. A degree of compression or deformation of the outer seal 50 is increased between the panel 2 and the retainer 30.

Each of the support-side convex portions 71 and a corresponding one of the retainer-side convex portions 72 are located out of alignment with each other in the rotation axial direction when they are in the installed state. When each of the support-side convex portions 71 and a corresponding one of the retainer-side convex portions 72 are placed out of alignment with each other in the rotation axial direction, the elasticity of the outer seal 50 will result in a decrease in gap or interval between the sensor support 20 and the retainer 30, thereby increasing the degree of compression or deformation of the inner seal 40. This causes the inner seal 40 to create a waterproof property and noise insulation.

Each of the support-side convex portions 71, as can be seen in FIG. 5, has the front support-side slant surface 73 facing in the forward direction and the rear support-side slant surface 74 facing in the reverse direction. Each of the retainer-side convex portion 72, as can be seen in FIG. 7, has the front retainer-side slant surface 75 facing in the forward direction and the rear retainer-side slant surface 76 facing in the reverse direction. This will result in a decrease in degree of torque produced upon overlap between the support-side convex portion 71 and the retainer-side convex portion 72 in the rotation axial direction, in other words, when the support-side convex portion 71 and the retainer-side convex portion 72 ride on one another during rotation of the sensor support 20 from the initial state.

Figure 4:
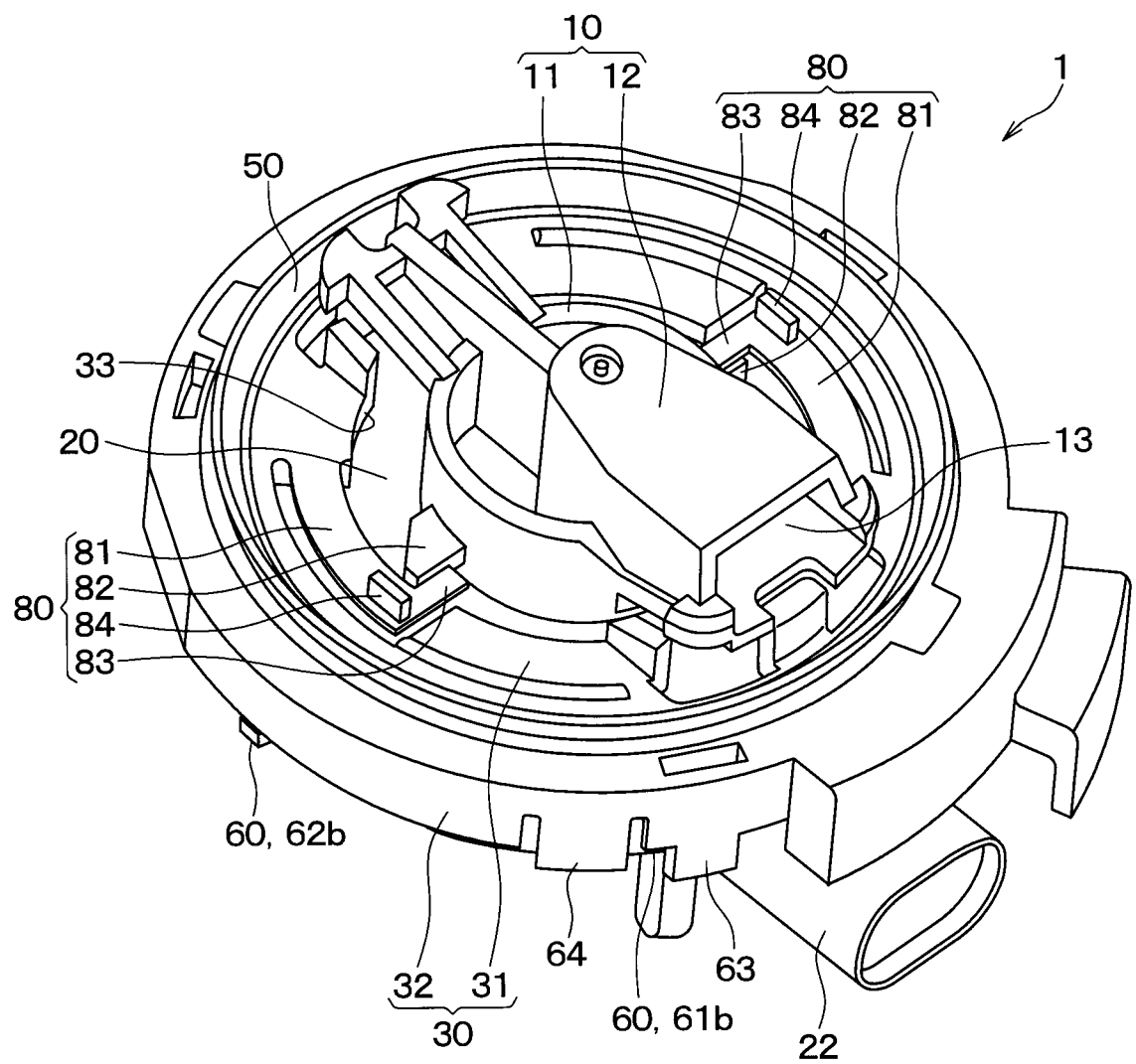
FIG. 4 is a perspective view which illustrates a sensor apparatus, as viewed facing a sensor protruding portion.

Each of the turn starters 80, as clearly illustrated in FIGS. 2, 4, and 5, includes the blade 81 and the stopper 82. The blade 81 is formed by a portion of the annular portion 31 of the retainer 30 and extends in a circumferential direction of the annular portion 31 (i.e., the rotational direction). Specifically, the blade 81 is made up of three portions: a first end firmly secured to the annular portion 31, a middle portion extending in the circumferential direction, and a second end 83 which is opposed to the first end and extends inwardly in the radial direction of the annular portion 31. The second end 83 of each of the blades 81 is highly elastically deformable in the rotation axial direction. The second end 83 of the blade 81 is equipped with the leg 84 extending away from the sensor support 20.

The stoppers 82 are disposed on a radially outer periphery of the cylinder 11 of the sensor protruding portion 10. Each of the stoppers 82 is located to be contactable with the second end 83 of a corresponding one of the blades 81 in the initial state. The stopper 82 has a thickness in the rotation axial direction which is substantially identical with that of the second end 83 of the blade 81 in the rotation axial direction. Accordingly, when the second end 83 of the blade 81 is elastically deformed in the rotation axial direction, it causes the second end 83 to be located away from the stopper 82 in the rotation axial direction. This enables the sensor support 20 and the sensor protruding portion 10 to be turned relative to the retainer 30.

How to install the sensor apparatus 1 in the panel 2 will be discussed with reference to a flowchart of FIG. 9 and FIGS. 10 to 13. In the following discussion, the sensor support 20 and the sensor protruding portion 10 will also be referred to as sensor portions 10 and 20 for the sake of brevity of explanation.

Figure 9:
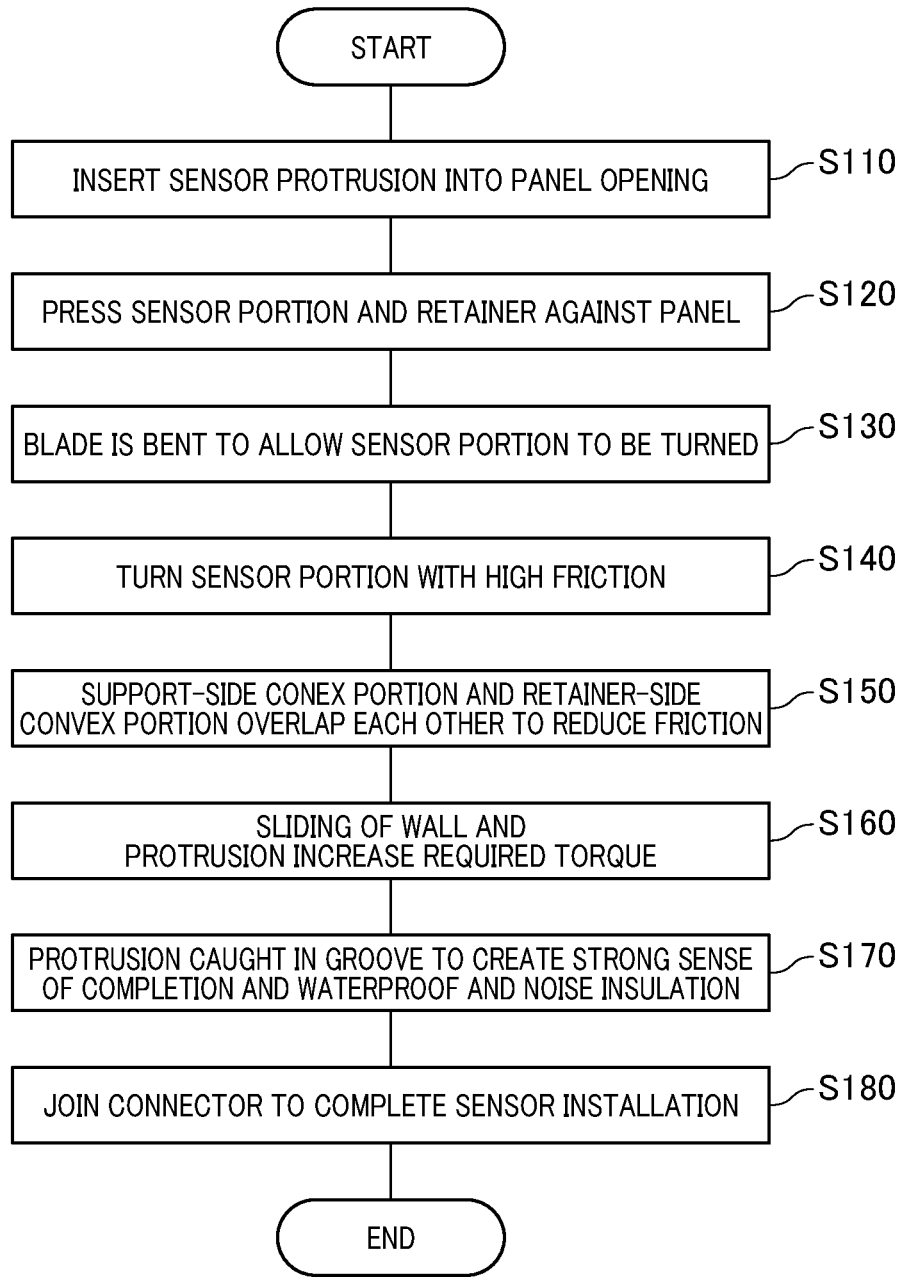
FIG. 9 is a flowchart of a sequence of operation to install a sensor apparatus in a wall according to the first embodiment.

First, in step S110 of FIG. 9, the sensor apparatus 1 which has the sensor portions 10 and 20 and the retainer 30 assembled into the initial state is prepared. The sensor protruding portion 10 of the sensor apparatus 1 is then inserted into the opening 3 of the panel 2.

Subsequently, in step S120, the sensor portions 10 and 20 and the retainer 30 are pressed against the panel 2 to compress the inner seal 40 and the outer seal 50.

Figure 10:
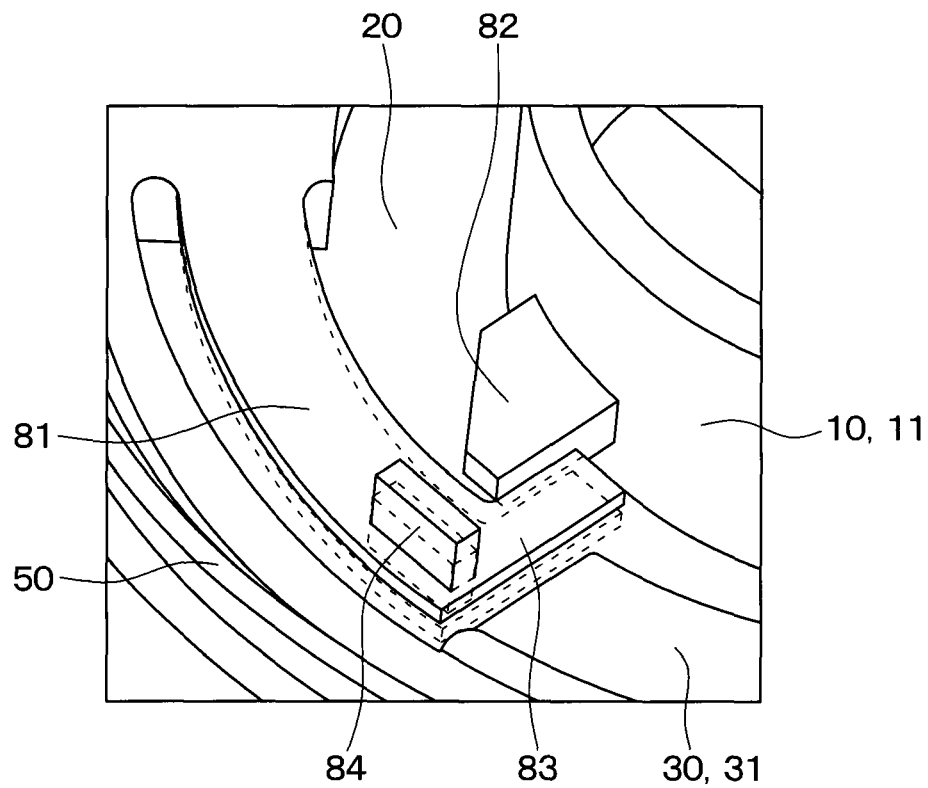
FIG. 10 is a partially enlarged view which illustrates a blade and a stopper of the sensor apparatus in FIG. 1.

In step S130, the leg 84 is, as demonstrated in FIG. 10, pressed by the panel 2 toward the sensor support 20 in the rotation axial direction, thereby causing the second end 83 of each of the blades 81 to be elastically deformed in the rotation axial direction. In FIG. 10, the second end 83 of the blade 81 elastically deformed in the second end 83 is indicated by a broken line. In such a state, the second end 83 of the blade 81 and the stopper 82 are located away from each other in the rotation axial direction. This permits the sensor portions 10 and 20 to be turned relative to the retainer 30.

Subsequently, in step S140, the sensor portions 10 and 20 are turned relative to the retainer 30 in the forward direction. The degree of compression or deformation of the inner seal 40 is relatively high, thereby resulting in an increased degree of mechanical friction between the inner seal 40 and the sensor support 20. The degree of torque required to turn the sensor portions 10 and 20 is, therefore, relatively high.

Figure 11A:
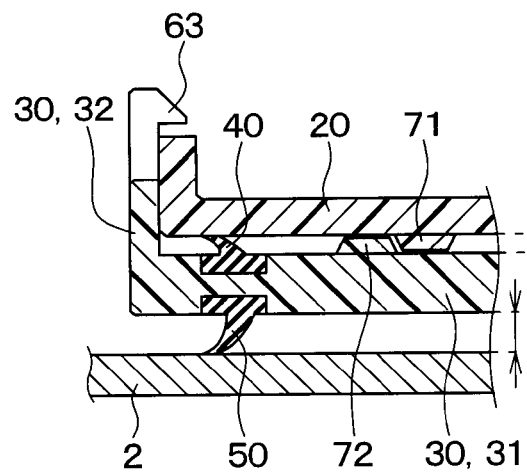
FIGS. 11(a) and 11(b) are sectional views of the sensor apparatus in FIG. 1 which represent a sequence of relative movements of a support-side convex portion and a retainer-side convex portion.
Figure 11B:
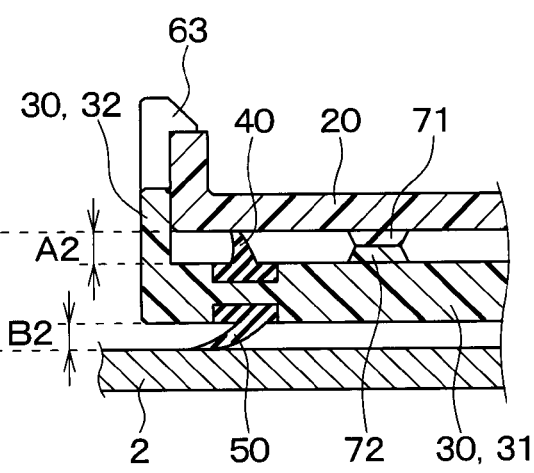

In step S150, when the sensor portions 10 and 20 continues to be turned relative to the retainer 30 in the forward direction, the support-side convex portion 71 and the retainer-side convex portion 72 becomes overlapped with each other in the rotation axial direction during the turn of the sensor portions 10 and 20. The process of overlap of the support-side convex portion 71 and the retainer-side convex portion 72 is demonstrated in FIGS. 11(a) and 11(b). FIG. 11(a) shows the sensor portion 20 and the retainer 30 in the initial state. FIG. 11(b) shows the sensor portions 10 and 20 which have been turned through a given angle from the initial state. In FIG. 11(b), the support-side convex portion 71 and the retainer-side convex portion 72 overlap each other in the rotation axial direction, so that the retainer 30 is moved close to the panel 2, thereby resulting in an increase in gap between the sensor support 20 and the retainer 30. Comparison between the FIGS. 11(a) and 11(b) shows that the gap or interval between the sensor support 20 and the retainer 30 meets a relation of A1<A2, and the interval between the retainer 30 and the panel 2 meets a relation of B1>B2. In FIG. 11(b), the degree of compression or deformation of the inner seal 40 is low, thus resulting in a decreased degree of friction between the inner seal 40 and the sensor support 20.

Figure 12:
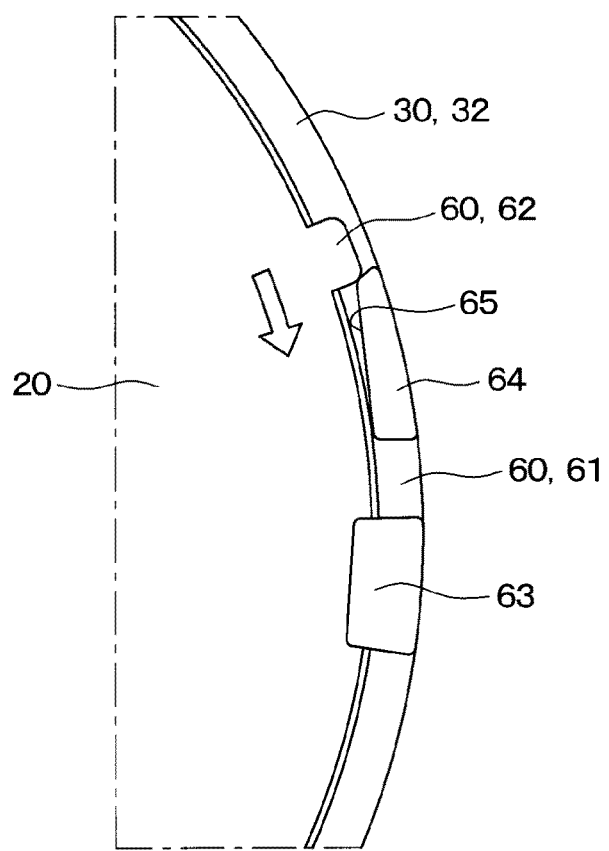
FIG. 12 is a partial view which represents relative movement of a protrusion and a sliding contact wall in the sensor apparatus in FIG. 1.
Figure 13:
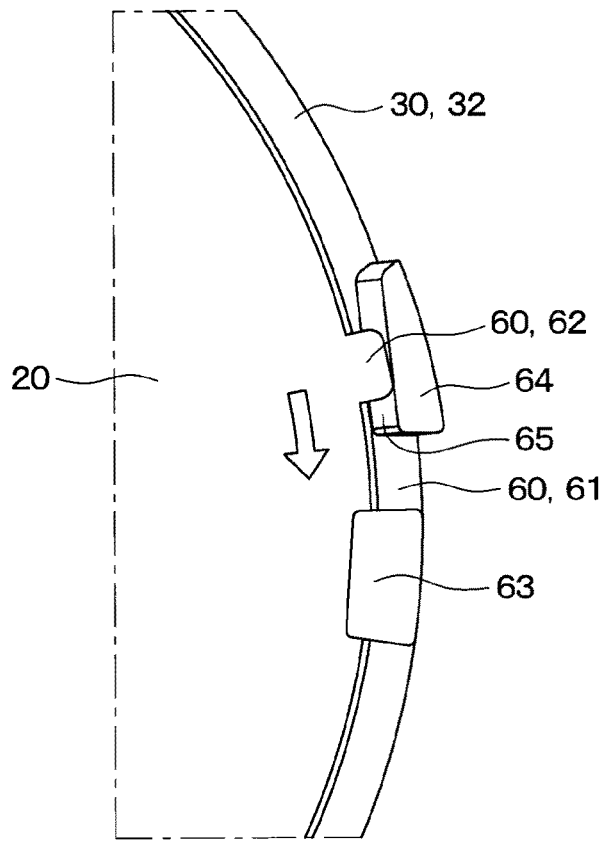
FIG. 13 is a partial view which represents relative movement of a protrusion and a sliding contact wall in the sensor apparatus in FIG. 1.

In step S160, the sensor portions 10 and 20 continues to be turned relative to the retainer 30 in the forward direction. This causes, as demonstrated in FIGS. 12 and 13, the slant sliding wall surface 65 that is a radially inner surface of each of the sliding contact walls 64 and a corresponding one of the protrusions 62 to slide on each other. FIGS. 12 and 13 demonstrate the process in which the sliding contact wall 64 contacts the protrusion 62 and is then deformed or moved radially outward along with turn of the sensor portions 10 and 20. The slant sliding wall surface 65, as described above, slopes close to the sensor support 20 in the forward direction, thereby causing the above described degree of torque required to rotate or turn the sensor portions 10 and 20 to be increased with turn of the sensor portions 10 and 20 in the forward direction. In this way, the sliding contact walls 64 function as the sense of complete installation creating springs.

Figure 14:
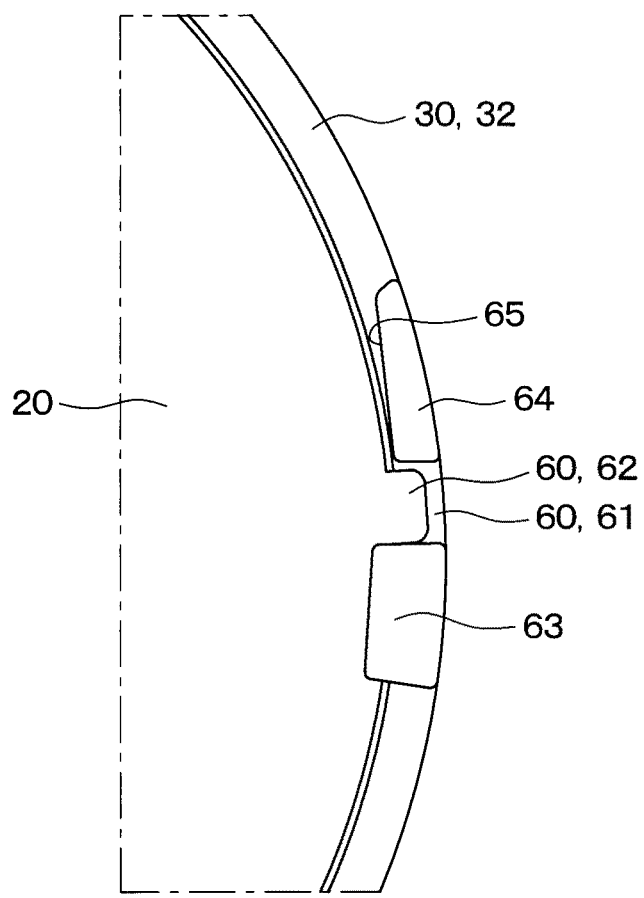
FIG. 14 is a partial view which illustrates engagement of a protrusion in a fitting groove in the sensor apparatus in FIG. 1.

In step S170, when each of the protrusions 62 is, as demonstrated in FIG. 14, moved away or disengaged from a corresponding one of the sliding contact walls 64, it is caught in the fitting groove 61, thereby resulting in instant disappearance of the high required torque. This causes the protrusion 62 to impact an end wall surface of the fitting groove 61 which faces away from the forward direction (i.e., a side surface of the fitting claw 63), thereby creating a high degree of the sense of complete installation. The operator perceives the sense of complete installation upon completion of his or her work.

The support-side convex portion 71 and the retainer-side convex portion 72 are placed out of alignment with each other in the rotation axial direction simultaneously with or immediately before disengagement of the protrusion 62 from the sliding contact wall 64. In other words, the support-side convex portion 71 and the retainer-side convex portion 72 are returned back to the state illustrated in FIG. 11(a). This results in a decrease in interval between the sensor support 20 and the retainer 30 to increase the degree of compression or deformation of the inner seal 40, thereby causing the inner seal 40 to create the waterproof and noise insulation properties.

Finally, in step S180, an external connector with wires or conductors is joined to the connector 22 of the sensor support 20. This completes the installation of the sensor apparatus 1 in the panel 2.

Figure 15:
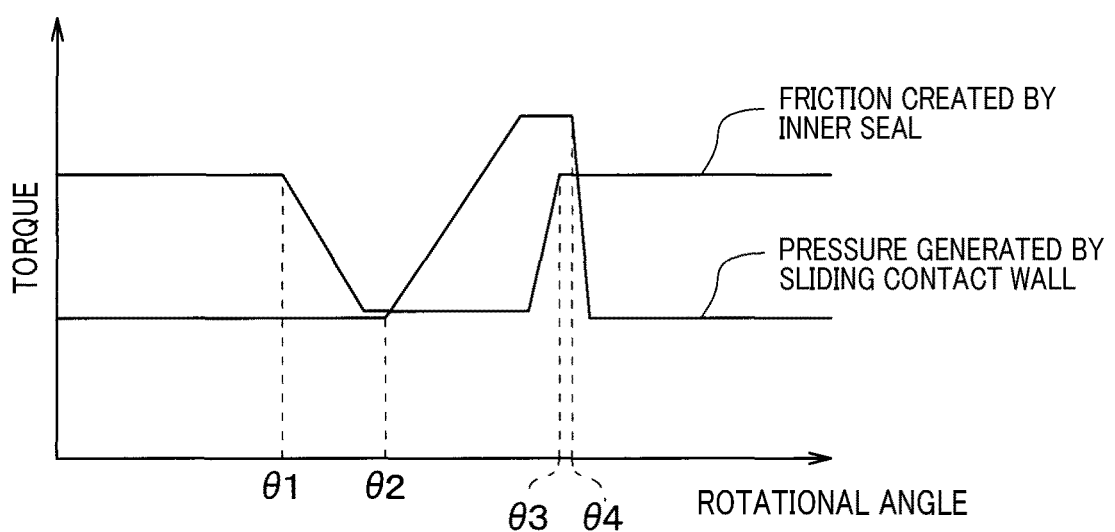
FIG. 15 is a graph which represents a change in torque required to turn a sensor support of the sensor apparatus in FIG. 1.

FIG. 15 is a graph which represents a change in the required torque through steps S140 to S170. A horizontal axis of the graph indicates an angle of rotation of the sensor portions 10 and 20. A vertical axis of the graph indicates the required torque. The inner seal 40 is, as described in step S140, subjected to a high degree of compression or deformation from start of turn of the sensor portions 10 and 20 until the sensor portions 10 and 20 are turned by angle $\theta 1$, thereby resulting in an increased degree of friction between the inner seal 40 and the sensor support 20.

When the support-side convex portion 71 and the retainer-side convex portion 72, as described in step S160, overlap each other in the rotation axial direction after the sensor portions 10 and 20 are turned by angle $\theta 1$, the degree of compression or deformation of the inner seal 40 become low, thereby resulting in a decreased degree of friction between the inner seal 40 and the sensor support 20.

After the sensor portions 10 and 20 are turned by an angle $\theta 2$, each of the sliding contact walls 64 serving as the sense of complete installation creating springs and a corresponding one of the protrusions 62, as described in step S160, slide on each other, thereby increasing the degree of the required torque.

When the sensor portions 10 and 20 are turned by an angle $\theta 3$, the support-side convex portion 71 and the retainer-side convex portion 72 are, as described in step S170, placed out of alignment with each other in the rotation axial direction, thereby causing the inner seal 40 to have the waterproof and noise insulation properties. At an angle $\theta 4$ that is identical with or immediately following the angle $\theta 3$, each of the protrusions 62 is disengaged from a corresponding one of the sliding contact walls 64, so that the protrusion 62 is fitted in the fitting groove 61, thereby resulting in instant disappearance of the high required torque. This causes the protrusion 62 to impact the end wall surface of the fitting groove 61 which faces away from the forward direction (i.e., the side surface of the fitting claw 63), thereby creating a high degree of the sense of complete installation.

The above described structure of the sensor apparatus 1 in the first embodiment offers the following beneficial advantages.

1) Before the sensor support 20 is placed in the installed state after been turned relative to the retainer 30 from the initial state, each of the friction reducers 70 works to increase the interval between the sensor support 20 and the retainer 30 to decrease the degree of friction created by the inner seal 40. In other words, each of the friction reducers 70 serves to decrease the friction generated by the inner seal 40 when the sensor portions 10 and 20 start to be turned to attach the sensor apparatus 1 to the panel 2. This results in a decrease in degree of torque required to turn the sensor portions 10 and 20, thereby enabling the operator to clearly perceive the sense of complete installation when the protrusions 62 engage the fitting grooves 61. This avoids a lack in turn of the sensor portions 10 and 20 relative to the retainer 30 in the sensor apparatus 1, thereby ensuring the stability in installing the sensor apparatus 1 in the panel 2.

2) Each of the friction reducers 70 in the first embodiment includes the support-side convex portion 71 and the retainer-side convex portion 72. The support-side convex portion 71 and the retainer-side convex portion 72 overlap each other in the rotation axial direction during turn of the sensor support 20 from the initial state, thereby increasing the interval between the sensor support 20 and the retainer 30.

When the support-side convex portion 71 and the retainer-side convex portion 72 are placed in the installed state, they are disengaged from each other, in other words, out of alignment with each other in the rotation axial direction, thereby causing the inner seal 40 to have the waterproof and noise insulation properties.

3) Each of the support-side convex portions 71, as described above, has the front support-side slant surface 73 facing the forward direction. Each of the retainer-side convex portions 72 has the rear retainer-side slant surface 76 facing the reverse direction. This enables the overlap of the support-side convex portion 71 and the retainer-side convex portion 72 in the rotation axial direction to be achieved using a low degree of torque during turn of the sensor support 20 from the initial state.

4) Each of the support-side convex portions 71 has the rear support-side slant surface 74 facing the reverse direction. Each of the retainer-side convex portions 72 has the front retainer-side slant surface 75 facing the forward direction. This causes the rear support-side slant surface 74 and the front retainer-side slant surface 75 to slide on each other when the support-side convex portion 71 and the retainer-side convex portion 72 become out of alignment with each other during turn of the sensor support 20 to install the sensor apparatus 1 in the panel 2, thereby accelerating the turn of the sensor support 20. This results in an increase in degree of the sense of complete installation perceived by the operator when the protrusions 62 engage the fitting grooves 61.

5) Each of the sliding contact walls 64 which slides in contact with a corresponding one of the protrusions 62 before the installed state is achieved following the initial state serves to increase the required torque by the friction between itself and the corresponding protrusion 62 and then release the friction upon engagement of the protrusion 62 in the fitting groove 61. Such release of the friction causes the rotational speed of the sensor support 20 to be accelerated by an increased degree of torque acting on the sensor support 20 until the release of the friction. This increases the sense of complete installation perceived by the operator when the protrusions 62 are fitted into the fitting grooves 61.

6) The radially inner surface of each of the sliding contact walls 64 is, as described above, designed as the slant sliding wall surface 65. This gradually increases the degree of torque required to turn the sensor portions 10 and 20 in the forward direction while the protrusions 62 and the sliding contact walls are sliding on each other. Accordingly, when the friction between the protrusion 62 and the sliding contact wall 64 is released immediately before the protrusion 62 engages the fitting groove 61, the rotational speed of the sensor support 20 is more accelerated, thereby increasing the sense of complete installation perceived by the operator upon the engagement of the protrusion 62 in the fitting groove 61.

7) The inner seal 40 is arranged outside the outer periphery of the friction reducers 70 in an annular shape. This eliminates a risk that water, as having entered a gap between the sensor support 20 and the retainer 30 through the through-hole 33 from the opening 3 of the panel 2, may leak radially outside the inner seal 40.

8) At least one of the sliding contact walls 64 is preferably shaped to be higher in level than the protrusions 62 in the rotation axial direction. This facilitates the ease with which the at least one of the sliding contact wall 64 is leaned radially outward when the sensor apparatus 1 is removed from the panel 2. This enables the operator to easily turn the sensor support 20 in the reverse direction in a condition where the sliding contact wall 64 is kept leaned radially outward, and the protrusions 62 are kept engaging the fitting grooves 61. This facilitates the removal of the sensor apparatus 1 from the panel 2.

Second Embodiment

The sensor apparatus 1 according to the second embodiment will be described below in which the configuration of the protrusions 62 disposed on the radially outer periphery of the sensor support 20 is different from that in the first embodiment. Other arrangements are identical with those in the first embodiment, and explanation thereof in detail will be omitted here.

Figure 16:
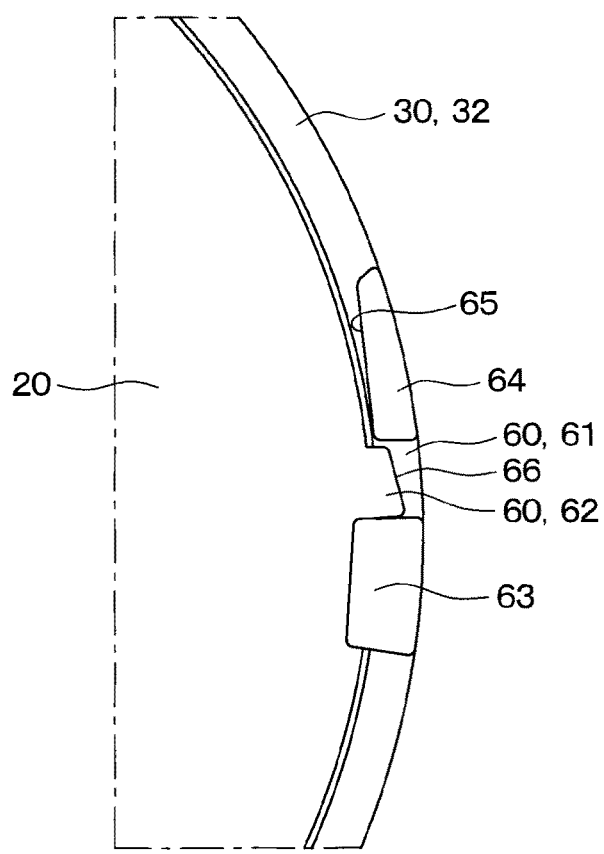
FIG. 16 is a partial plan view which illustrates engagement of a protrusion in a fitting groove of a sensor apparatus according to the second embodiment.
Figure 17:
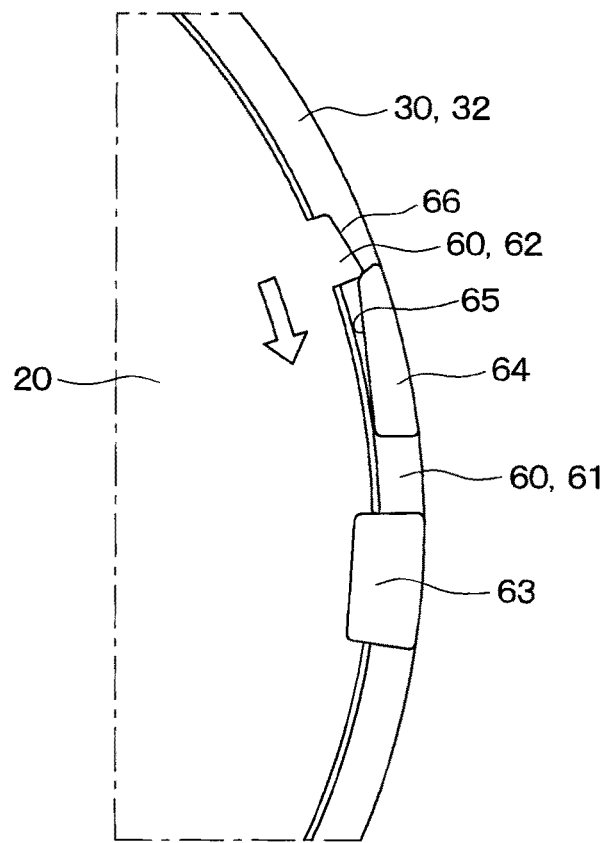
FIG. 17 is a partial plane view which illustrates movement of a protrusion and a sliding contact wall in the sensor apparatus in FIG. 16.
Figure 18:
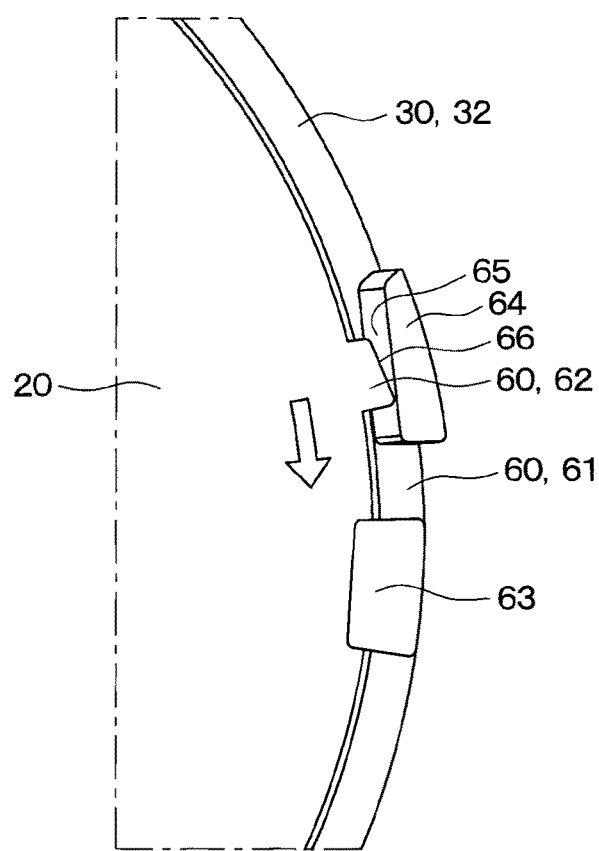
FIG. 18 is a partial view which represents relative movement of a protrusion and a sliding contact wall in the sensor apparatus in FIG. 16.
Figure 19:
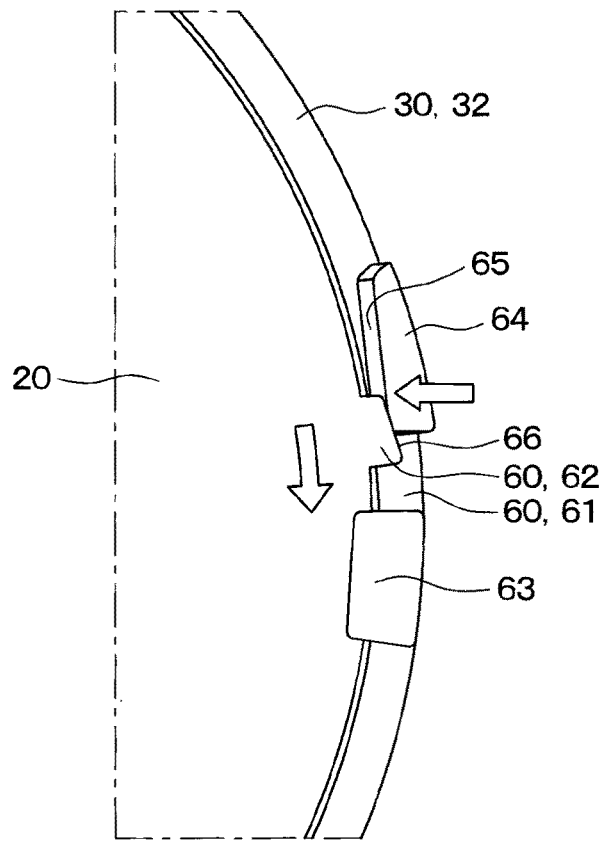
FIG. 19 is a partial view which represents relative movement of a protrusion and a sliding contact wall in the sensor apparatus in FIG. 16.
Figure 20:
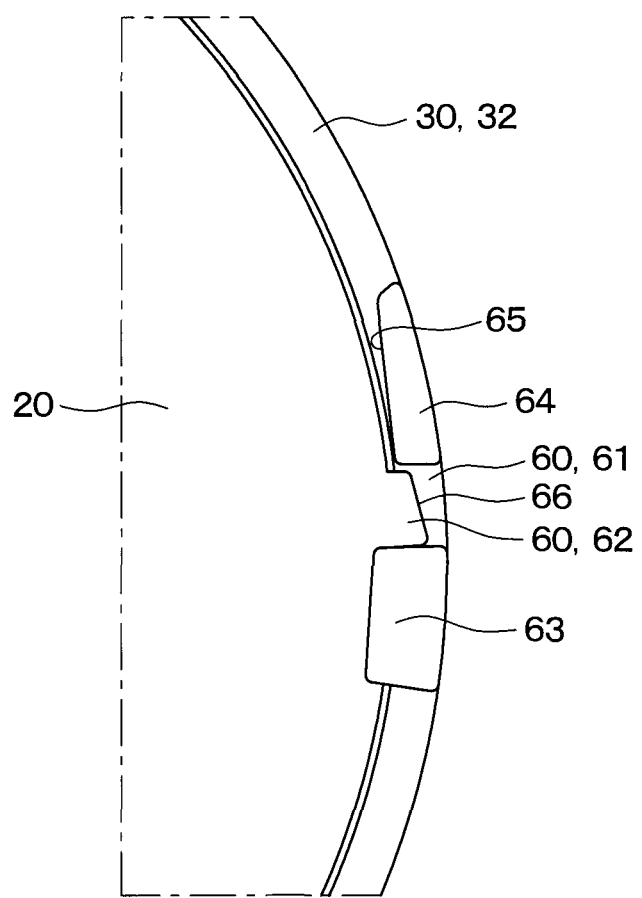
FIG. 20 is a partial view which represents relative movement of a protrusion and a sliding contact wall in the sensor apparatus in FIG. 16.

Each of the protrusions 62 of the fasteners 60 in the second embodiment, as illustrated in FIG. 16, has the slant protruding surface 66 which faces radially outward. The slant protruding surface 66 which slopes away from the axis of rotation of the sensor support 20 in the forward direction when the installed state is entered from the initial state. In other words, the slant protruding surface 66 slopes radially outward at a constant rate in the forward direction.

FIGS. 17 to 20 demonstrate the process in which the sensor portions 10 and 20 are turned to install the sensor apparatus 1 in the panel 2. When a portion of each of the protrusions 62 is, as demonstrated in FIG. 19, moved away from a corresponding one of the sliding contact walls 64 during rotation of the sensor portions 10 and 20 relative to the retainer 30, it causes the protrusion 62 to be thrust in the forward direction by the sliding motion of the slant protruding surface 66 on the slant sliding wall surface 65. This accelerates the rotational speed of the sensor support 20, thereby causing the protrusion 62 to quickly impact the wall surface of the fitting groove 61 facing away from the forward direction (i.e., the side surface of the fitting claw 63). This increases the sense of complete installation perceived by the operator upon engagement of the protrusion 62 in the fitting groove 61.

Third Embodiment

The sensor apparatus 1 according to the third embodiment will be described below in which structures of the turn starters 80, the fasteners 60, and the friction reducers 70 are partly different from those in the first embodiment. Other arrangements are identical with those in the first embodiment, and explanation thereof in detail will be omitted here.

Figure 21:
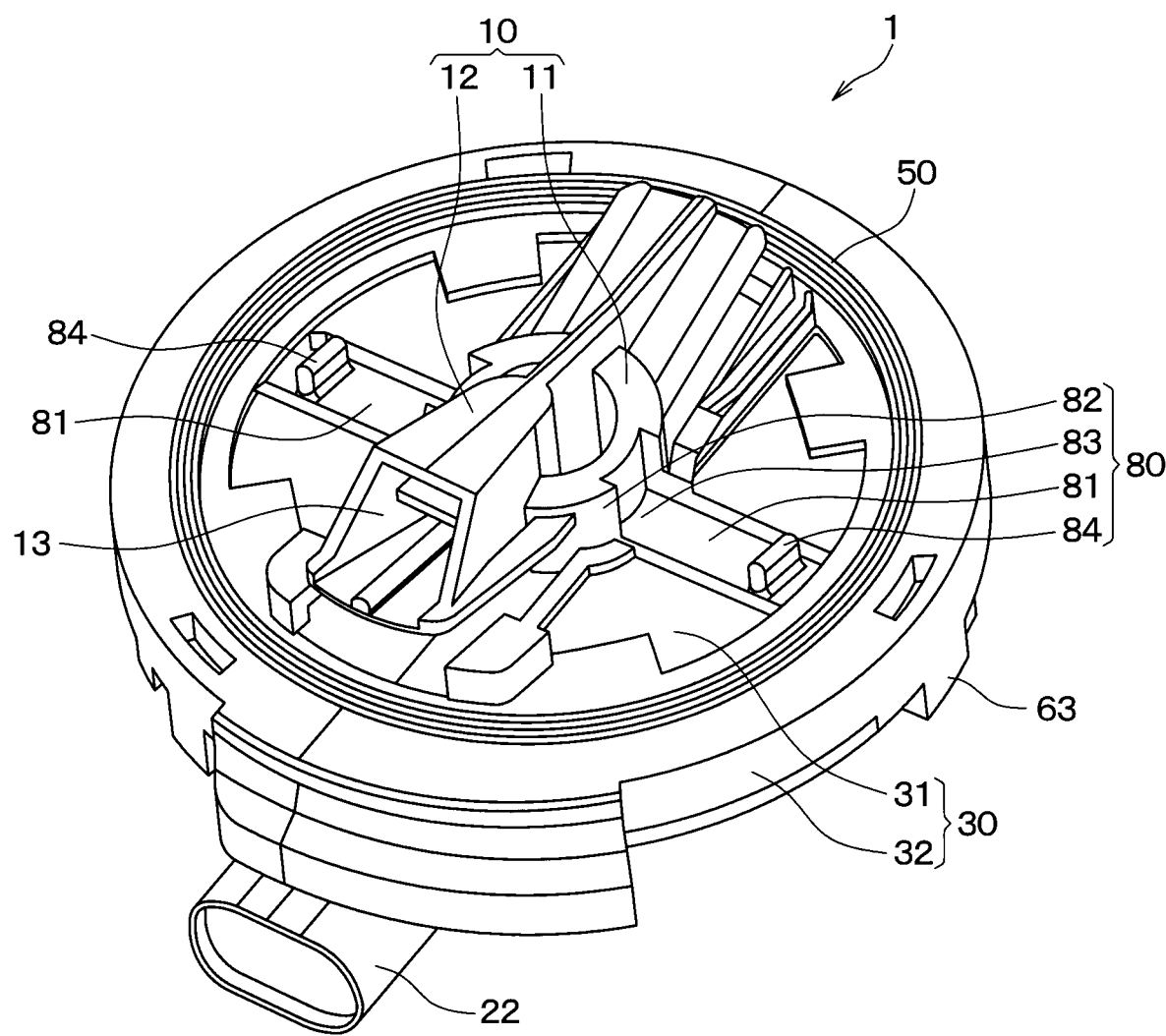
FIG. 21 is a perspective view which illustrates a sensor apparatus according to the third embodiment, as viewed facing a sensor protruding portion.
Figure 22:
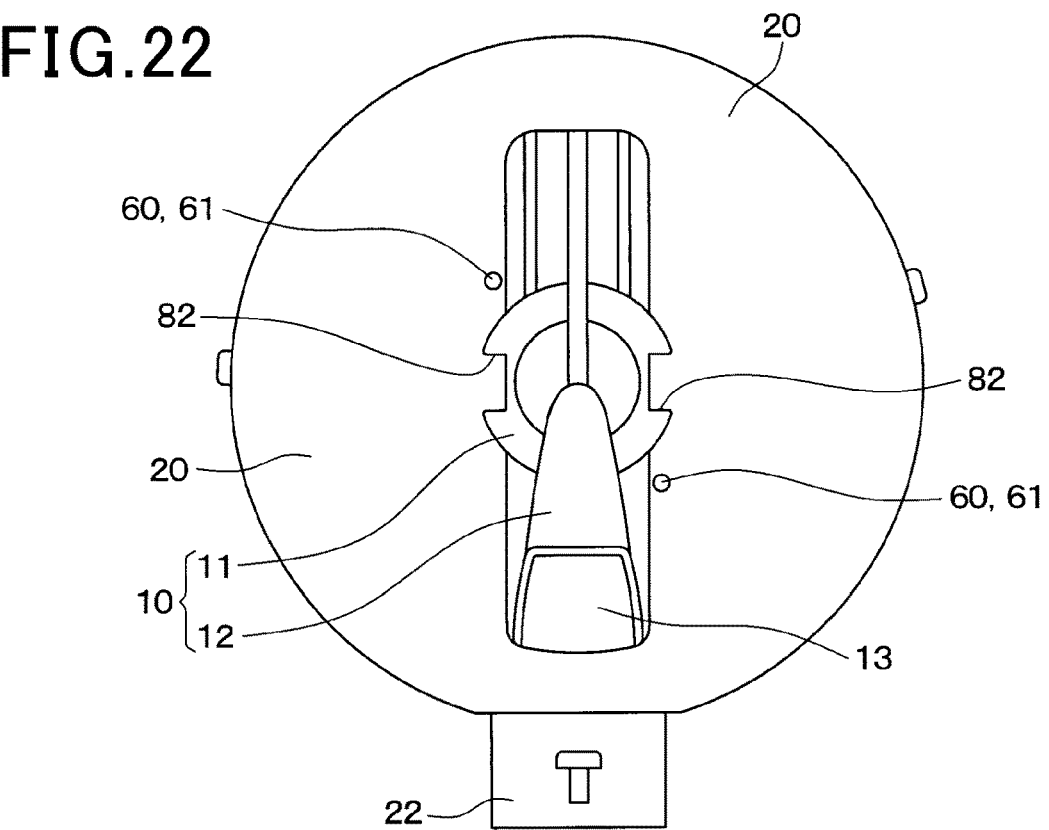
FIG. 22 is a plan view which illustrates a sensor support of the sensor apparatus in FIG. 21, as viewed facing a sensor protruding portion.
Figure 23:
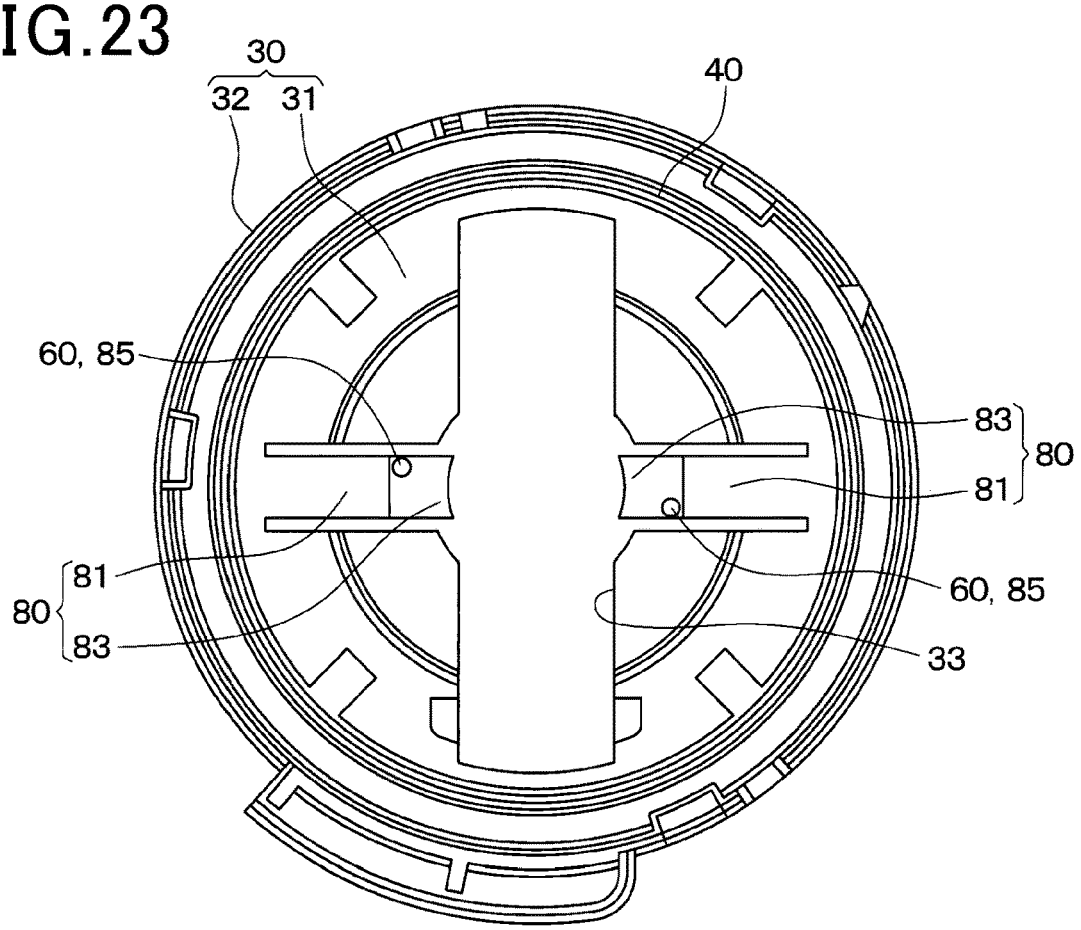
FIG. 23 is a plan view which illustrates a retainer of the sensor apparatus in FIG. 21, as viewed facing a sensor support.

The sensor apparatus 1 in the third embodiment is, like in the first embodiment, equipped with the turn starters 80 each of which, as illustrated in FIGS. 21 to 23, includes the blade 81 and the stopper 82. The blade 81 extends from the annular portion 31 of the retainer 30 in the radial direction of the retainer 30. Specifically, the blade 81 has an end firmly secured to the annular portion 31 and radially inwardly extend to have the second end 83 located close to the center of the retainer 30. The second end 83 of the blade 81 is elastically deformable largely in the rotation axial direction. The blade 81 is equipped with the leg 84 extending away from the sensor support 20.

The stopper 82 is disposed in a radially outer periphery of the cylinder 11 of the sensor protruding portion 10. In other words, the stopper 82 is formed by an outer peripheral portion of the cylinder 11. In the initial state, the stopper 82 is placed in contact with the second end 83 of the blade 81. Upon elastically deformation of the second end 83 of the blade 81 in the rotation axial direction, the second end 83 is moved away from the stopper 82 in the rotation axial direction. This permits the sensor portions 10 and 20 to be turned relative to the retainer 30.

Each of the friction reducers 70 includes the blade 81, the leg 84, and the blade-side convex portion 85. The blade-side convex portion 85 protrudes from the blade 81 toward the sensor support 20. FIG. 24(a) illustrates the sensor protruding portion 10 inserted into the opening 3 of the panel 2 in the initial state. FIG. 24(b) illustrates the sensor apparatus 1 pressed against the panel 2 in the initial state.

When the sensor apparatus 1 is pressed against the panel 2 in the way illustrated in FIG. 24(b), it causes the leg 84 of the blade 81 which faces the panel 2 to be thrust by the panel 2 toward the sensor support 20. This results in large elastic deformation of the second end 83 of the blade 81 toward the sensor support 20, thereby causing the blade-side convex portion 85 to press the sensor support 20 away from the panel 2. This leads to an increased gap between the sensor support 20 and the retainer 30.

Comparison between the FIGS. 24(a) and 24(b) shows that the gap or interval between the sensor support 20 and the retainer 30 meets a relation of A1<A2, and the interval between the retainer 30 and the panel 2 meets a relation of B1>B2. The degree of compression or deformation of the inner seal 40 secured to the retainer 30 is, therefore, low, thereby resulting in a decreased degree of friction between the inner seal 40 and the sensor support 20. The low degree of compression or deformation of the inner seal 40 may also include a situation that such degree is zero.

Figure 25:
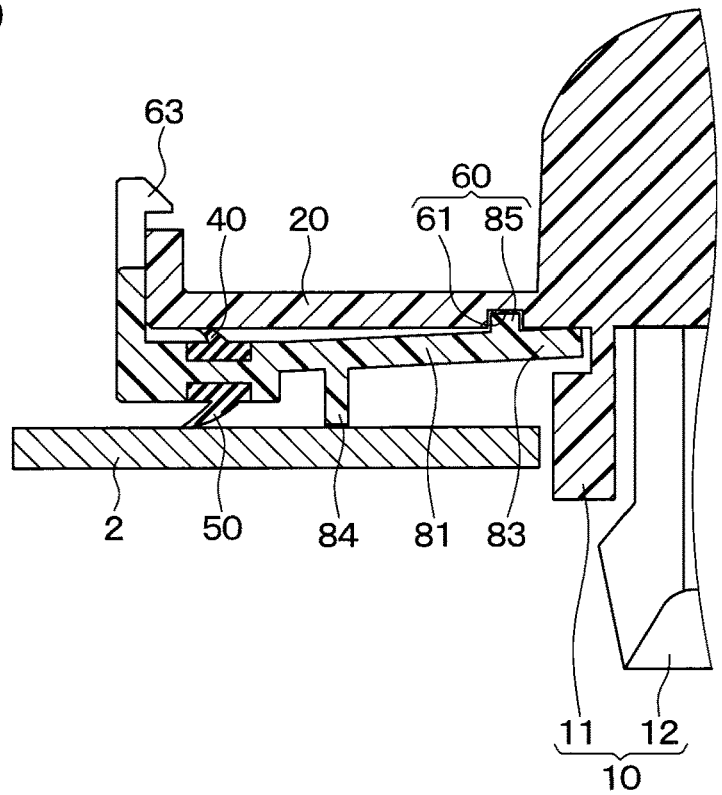
FIG. 25 is a partial sectional view which illustrates engagement of a blade-side protrusion in a fitting groove of the sensor apparatus in FIG. 21.

Each of the fasteners 60, as clearly illustrated in FIGS. 22, 23, and 25, includes the fitting groove 61 formed in the surface of the sensor support 20 which faces the retainer 30 and the above described blade-side convex portion 85. When the sensor support 20 and the retainer 30 are placed in the installed state to secure the sensor apparatus 1 to the panel 2, the blade-side convex portions 85 engage the fitting grooves 61 of the sensor support 20, thereby resulting in a decreased interval between the sensor support 20 and the retainer 30. This increases the degree of compression or deformation of the inner seal 40, thereby causing the inner seal 40 to have the waterproof and noise insulation properties.

How to install the sensor apparatus 1 in the third embodiment to the panel 2 will be discussed with reference to a flowchart of FIG. 26.

Figure 26:
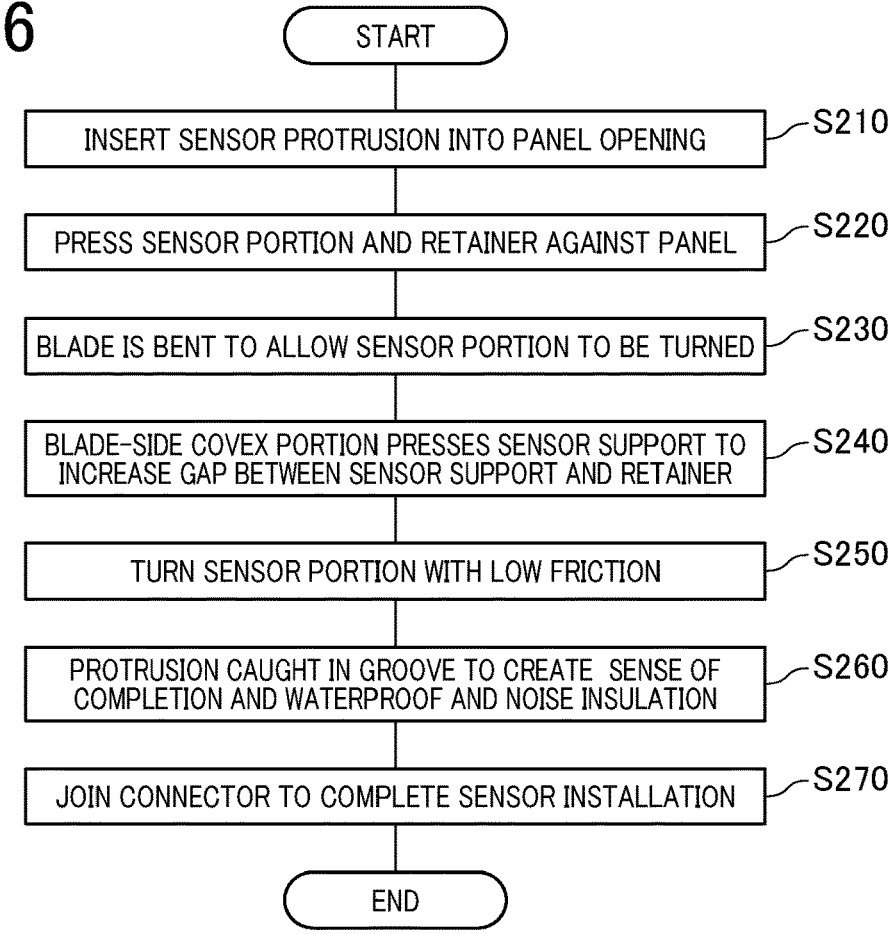
FIG. 26 is a flowchart of a sequence of operation to install the sensor apparatus in FIG. 21 in a wall.

First, in step S210 of FIG. 26, the sensor apparatus 1 which has the sensor portions 10 and 20 and the retainer 30 assembled is prepared. The sensor protruding portion 10 of the sensor apparatus 1 is, as demonstrated in FIG. 24(*a*), inserted into the opening 3 of the panel 2.

Figure 24:
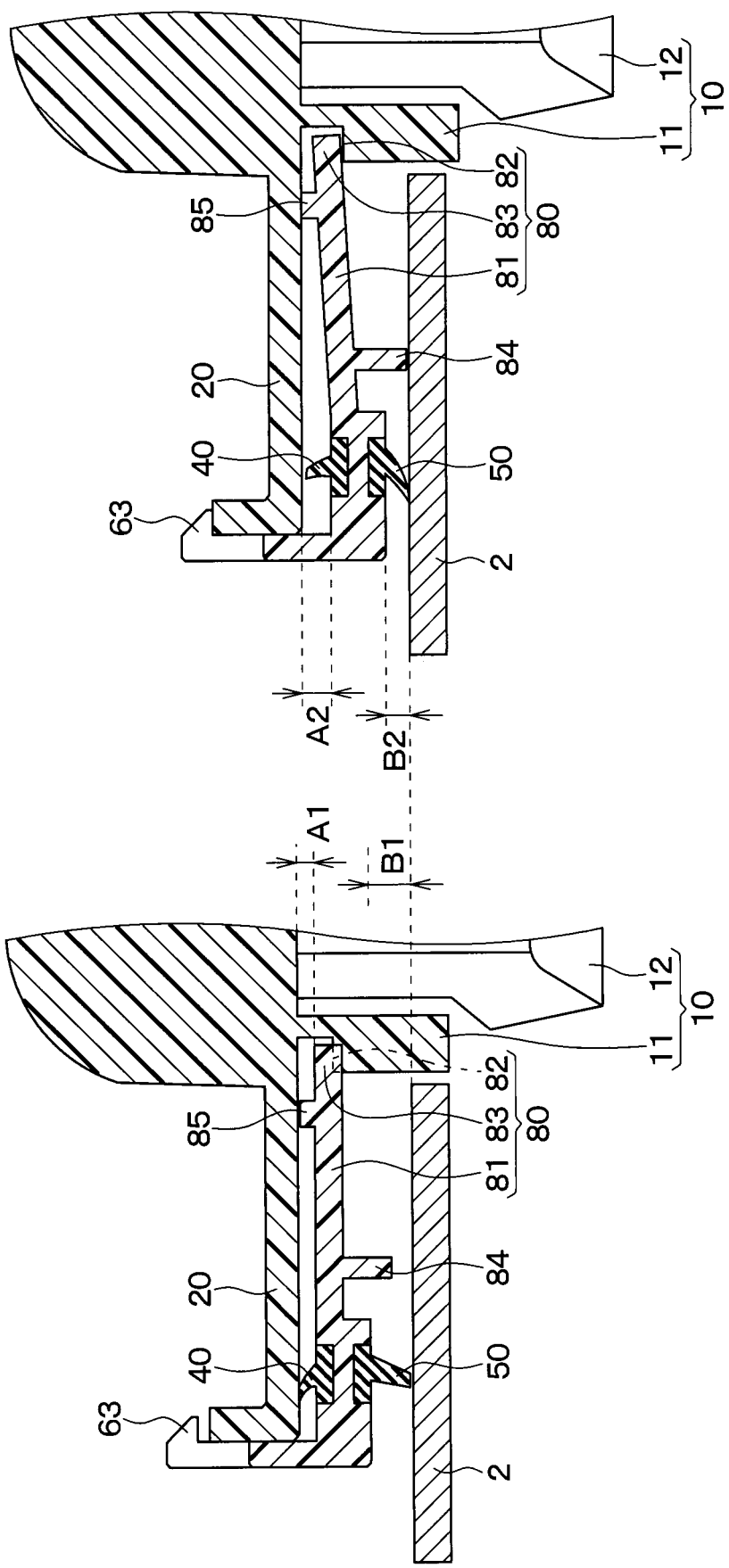
FIGS. 24(a) and 24(b) are partial sectional views which illustrate movements of a sensor support and a retainer of the sensor apparatus in FIG. 21.

Subsequently, in step S220, the sensor portions 10 and 20 and the retainer 30 are, as demonstrated in FIG. 24(*b*), pressed against the panel 2 to compress the outer seal 50.

In step S230, the leg 84 is pressed by the panel 2 toward the sensor support 20 in the rotation axial direction, thereby causing the second end 83 of each of the blades 81 to be elastically deformed toward the sensor support 20 in the rotation axial direction. The second end 83 of the blade 81 and the stopper 82 are located away from each other in the rotation axial direction. This permits the sensor portions 10 and 20 to be turned relative to the retainer 30.

Subsequently, in step S240, the blade-side convex portion 85 on the blade 81 presses the sensor support 20 away from the panel 2, thereby increasing the interval between the sensor support 20 and the retainer 30. The degree of compression or deformation of the inner seal 40 installed on the retainer 30, thereby decrease the degree of friction between the inner seal 40 and the sensor support 20.

In step S250, the sensor portions 10 and 20 continues to be turned with the decreased degree of the friction relative to the retainer 30 in the forward direction.

In step S260, each of the blade-side convex portions 85 is, as illustrated in FIG. 25, caught in a corresponding one of the fitting grooves 61 formed in the sensor support 20. Mechanical vibration or sound arising from such an event is transmitted to the operator, so that the operator perceives the sense of complete installation upon completion of his or her work. The catching of the blade-side convex portion 85 in the fitting groove 61 results in a decreased interval between the sensor support 20 and the retainer 30. This leads to a decreased degree of compression or deformation of the inner seal 40, thereby causing the inner seal 40 to have the waterproof and noise insulation properties.

Finally, in step S270, an external connector with wires or conductors is joined to the connector 22 of the sensor support 20. This completes the installation of the sensor apparatus 1 in the panel 2.

The above described structure of the sensor apparatus 1 in the third embodiment offers substantially the same beneficial advantages as those in the first embodiment.

Specifically, each of the friction reducers 70 serves to decrease the friction, in other words, resistance generated by the inner seal 40 against turning of the sensor portions 10 and 20 to attach the sensor apparatus 1 to the panel 2. This results in a decrease in degree of torque required to turn the sensor portions 10 and 20, thereby enabling the operator to clearly perceive the sense of complete installation generated by the catching of the blade-side convex portions 85 in the fitting grooves 61. This avoids a lack in turn of the sensor portions 10 and 20 relative to the retainer 30 in the sensor apparatus 1, thereby ensuring the stability in installing the sensor apparatus 1 in the panel 2.

Other Modifications

The sensor apparatus 1 has been described as being installed in the wall, such as the inner door panel 2 of the vehicle, but however, may be secured to any other kinds of walls.

The first and second embodiments, as described above, have the fitting grooves 61 of the fasteners 60 which are formed in the retainer 30 and also have the protrusions 62 formed on the sensor support 20, but however, may alternatively be designed to have the fitting grooves 61 of the fasteners 60 formed in the sensor support 20 and also have the protrusions 62 disposed on the retainer 30.

The first and second embodiments, as described above, have the inner seal 40 arranged radially outside the friction reducers 70, but however, may alternatively be designed to have the inner seal 40 arranged radially inside the friction reducers 70 in an annular shape.

Each of the embodiments has the inner seal 40 to create the waterproof and noise insulation properties, but however, the inner seal 40 may alternatively be configured to have at least one of the waterproof property and the noise insulation property. Similarly, the outer seal 50 may be configured to have at least one of the waterproof property and the noise insulation property.

While the preferred embodiments have been disclosed in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The component parts described in the above embodiments are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principal. Similarly, when the shape of, the orientation of, or the positional relation among the component parts is referred to in the above discussion, this disclosure is not limited to it unless otherwise specified or viewed to be essential in principal.

What is claimed is:

1. A sensor apparatus which is configured to be installable to a wall in use, comprising:

a sensor protruding portion which is configured to be inserted into an opening formed in the wall;

a sensor support which is formed integrally with the sensor protruding portion and larger in size than the opening;

a retainer which has formed therein a through-hole through which the sensor protruding portion passes, the retainer being configured to be arranged between the sensor support and the wall and rotatable relative to the sensor protruding portion and the sensor support;

an inner seal which is disposed between the sensor support and the retainer;

an outer seal which is configured to be disposed between the wall and the retainer;

a fastener which includes a fitting groove and a protrusion, the fitting groove being formed in one of the sensor support and the retainer, the protrusion being formed on other of the sensor support and the retainer, the fitting groove and the protrusion being configured to achieve engagement with each other when the sensor support has been brought from an initial state where the sensor protruding portion is inserted into the opening of the wall into an installed state where the sensor support has been turned by a given angle from the initial state; and a friction reducer which works to increase an interval between the sensor support and the retainer to reduce a degree of friction created by the inner seal before the sensor support is placed in the installed state after being turned relative to the retainer from the initial state.

2. The sensor apparatus as set forth in claim 1, wherein the friction reducer includes a support-side convex portion and a retainer-side convex portion, the support-side convex portion being shaped to protrude from the sensor support toward the retainer in a rotation axial direction, the retainer-side convex portion being shaped to protrude from the retainer toward the sensor support in the rotation axial direction, the retainer-side convex portion and the rotation axial direction overlap each other in the rotation axial direction to increase the interval between the sensor support and the retainer during turning of the sensor support from the initial state, and the support-side convex portion and the retainer-side convex portion are placed out of alignment with each other in the rotation axial direction when the installed state is entered, thereby causing the inner seal to have waterproof and noise insulation properties.

3. The sensor apparatus as set forth in claim 1, further comprising a sliding contact wall which slides on the protrusion before the installed state is entered from the initial state, and wherein the sliding contact wall works to create friction between itself and the protrusion to increase a degree of torque required to turn the sensor support and the retainer relative to each other before the installed state is established following the initial state, and then release the friction between the sliding contact wall and the protrusion upon engagement of the protrusion in the fitting groove.

4. The sensor apparatus as set forth in claim 3, wherein the protrusion is disposed on a radially outer portion of the sensor support, the sliding contact wall is disposed on a radially outer portion of the retainer, and the sliding contact wall has a slant sliding wall surface which slopes so as to approach the sensor support in a rotational direction in which the sensor support is turned before the installed state is entered from the initial state.

5. The sensor apparatus as set forth in claim 3, wherein the protrusion is disposed on a radially outer portion of the sensor support, the sliding contact wall is disposed on a radially outer portion of the retainer, and the protrusion has a slant protruding surface which slopes away from an axis of rotation of the sensor support in a rotational direction when the installed state is entered from the initial state.

6. The sensor apparatus as set forth in claim 3, wherein the sliding contact wall is shaped to be taller than the protrusion in a rotation axial direction.

7. The sensor apparatus as set forth in claim 1, wherein the inner seal is arranged radially outside or inside the friction reducer in an annular shape.

* * * * *